United States Patent
Fu et al.

(10) Patent No.: US 10,426,005 B2
(45) Date of Patent: Sep. 24, 2019

(54) DIMMING DRIVER CIRCUIT AND CONTROL METHOD THEREOF

(71) Applicant: Delta Electronics (Shanghai) Co., Ltd., Shanghai (CN)

(72) Inventors: Xiaoping Fu, Shanghai (CN); Xinghua Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 9 days.

(21) Appl. No.: 15/489,207

(22) Filed: Apr. 17, 2017

(65) Prior Publication Data

US 2017/0325304 A1 Nov. 9, 2017

(30) Foreign Application Priority Data

May 4, 2016 (CN) .......................... 2016 1 0290293

(51) Int. Cl.
*H05B 33/08* (2006.01)
*H02M 1/08* (2006.01)
(Continued)

(52) U.S. Cl.
CPC .......... *H05B 33/0818* (2013.01); *H02M 1/08* (2013.01); *H02M 3/156* (2013.01); *H05B 33/0851* (2013.01); *H02M 2001/0009* (2013.01)

(58) Field of Classification Search
CPC ............ H05B 33/0815; H05B 33/0818; H05B 33/0845; H05B 41/2828; H05B 41/2827;
(Continued)

(56) References Cited

U.S. PATENT DOCUMENTS 8,179,110 B2 * 5/2012 Melanson ............. H02M 3/156
323/282
2005/0231133 A1 * 10/2005 Lys ...................... H02M 1/4225
315/291
(Continued)

FOREIGN PATENT DOCUMENTS

CN 101204121 A 6/2008
CN 103327676 A 9/2013
(Continued)

*Primary Examiner* — Alexander H Taningco
*Assistant Examiner* — Kurtis R Bahr
(74) *Attorney, Agent, or Firm* — Kirton McConkie; Evan R. Witt

(57) ABSTRACT

A control method for a dimming driver circuit is provided. Firstly, a detecting signal is generated according to a result of detecting a parameter of a power converting unit. Then, the dimming current is compared with a preset current threshold value. If the dimming current is higher than the preset current threshold value, a status information of a switch element of the power converting unit is determined according to the detecting signal, and a first setting is defined. If the dimming current is lower than or equal to the preset current threshold value, the status is determined according to the detecting signal, a pulse ratio in a chopping cycle is calculated, and a second setting is defined. According to the first setting or the second setting, an initial control signal is adjusted to a real control signal to control the switch element.

19 Claims, 16 Drawing Sheets

(51) Int. Cl.
*H02M 3/156* (2006.01)
*H02M 1/00* (2006.01)

(58) Field of Classification Search
CPC ...... H05B 41/3927; H05B 37/02; H03K 3/30;
H02M 3/156; G09G 3/3406
USPC ... 315/224, 291, 307, 209 R, 247, 308, 219;
345/102, 212; 323/282, 285, 271;
363/37, 21.12; 362/800; 327/108
See application file for complete search history.

(56) References Cited

U.S. PATENT DOCUMENTS

| | | | | | |
|---|---|---|---|---|---|
| 2011/0148324 | A1* | 6/2011 | Du | ..................... | H05B 33/0812 |
| | | | | | 315/297 |
| 2014/0042919 | A1* | 2/2014 | Yang | .................. | H05B 33/0827 |
| | | | | | 315/186 |
| 2015/0084544 | A1* | 3/2015 | Mitterbacher | ..... | H05B 33/0818 |
| | | | | | 315/294 |
| 2016/0088700 | A1* | 3/2016 | Shaffer | .............. | H05B 33/0848 |
| | | | | | 315/200 R |

FOREIGN PATENT DOCUMENTS

| | | | |
|---|---|---|---|
| JP | 2012226924 A | 11/2012 | |
| JP | 2015170673 A | 9/2015 | |

\* cited by examiner

DIMMING DRIVER CIRCUIT AND CONTROL METHOD THEREOF

FIELD OF THE INVENTION

The present invention relates to a driver circuit and a control method thereof, and more particularly to a dimming driver circuit and a control method thereof.

BACKGROUND OF THE INVENTION

Generally, a dimming driver circuit can be used to adjust the brightness of a lighting device. A conventional dimming driver circuit comprises a power converting unit, a control unit and a current detection resistor. The power converting unit receives an input voltage and converts the input voltage into an output voltage. The output voltage is outputted to a light-emitting element in order to illuminate the light-emitting element. The current detection resistor is serially connected with the power converting unit for detecting the output current from the power converting unit and generating a corresponding detecting voltage signal. The detecting voltage signal is the voltage difference between the two ends of the current detection resistor. The control unit is electrically connected with the power converting unit and the current detection resistor for receiving the detecting voltage signal and a dimming signal and comparing the detecting voltage signal with the dimming signal. According to the comparing result, the magnitude of the output current from the power converting unit is adjusted to comply with the dimming signal.

In the close-loop control system, the control unit of the conventional dimming driver circuit usually employs the analog dimming technology. However, the analog dimming technology faces a challenge. That is, the precision of the output current is usually unsatisfied because a current detection resistor is used to detect the current. The tolerance, deviation and delay of the analog dimming technology result in a relatively fixed error. Under this circumstance, the precision of the output current is reduced, and the output current cannot be designated or controlled. Since the output current from the power converting unit cannot be precisely adjusted according to the dimming signal, the purpose of widening the dimming range cannot be achieved.

Moreover, the conventional dimming circuit uses a single dimming technology to adjust the brightness of the light emitting diode. For example, the dimming range for the analog dimming technology is in the range between 10% and 100%. Moreover, the dimming range for the PWM dimming technology is in the range between 1% and 100%. However, in many situations such as the scene lighting situation or the building lighting situation, plural light emitting diodes generate different color light beams. Under this circumstance, the dimming range for each light emitting diode should be as wide as possible. For example, the dimming range for the light emitting diode has to be in the range between 0.1% and 100%, or even in the range between 0.01% and 100%. In other words, the conventional dimming driver circuit cannot achieve the above purpose.

Therefore, there is a need of providing a dimming driver circuit and a control method in order to overcome the drawbacks of the conventional technologies.

SUMMARY OF THE INVENTION

An object of the present invention provides a dimming driver circuit and a control method in order to widen the dimming range.

In accordance with an aspect of the present invention, there is provided a control method for a dimming driver circuit. The dimming driver circuit is configured for adjusting brightness of a light emitting diode. The dimming driver circuit includes a power converting unit. The power converting unit includes a switch element. The switching element is alternately turned on or turned off in plural switching cycles during a switching operation. The control method includes the following steps. In a step (a), an initial control signal composed of plural pulses is previously defined. The plural pulses are generated at a pulse frequency. The switch element is turned on in the switching cycle corresponding to each pulse. In a step (b), at least one detecting signal is generated according to a result of detecting at least one parameter of the power converting unit. In a step (c), a dimming signal is received and processed, and thus a corresponding dimming current is generated. In a step (d), the dimming current is compared with a preset current threshold value. In a step (e), a first setting or a second setting is defined according to a judging result of the step (d). If the dimming current is higher than the preset current threshold value, a status information of the switch element in each switching cycle is determined according to the at least one detecting signal and a first setting process, so that the first setting is defined. If the dimming current is lower than or equal to the preset current threshold value, the status information of the switch element in each switching cycle is determined according to the at least one detecting signal and a second setting process, the switching operation of the switch element is divided into plural chopping cycles, and a pulse ratio in at least one chopping cycle is calculated according to the dimming current and the preset current threshold value, so that the second setting is defined. In a step (f), the plural pulses of the initial control signal are adjusted according to the first setting or the second setting, so that a corresponding real control signal is generated. The switching operation of the switch element is controlled according to the real control signal. An output current corresponding to the dimming signal is generated from the power converting unit to the light emitting diode so as to control the brightness of the light emitting diode.

In accordance with another aspect of the present invention, there is provided a dimming driver circuit for adjusting brightness of a light emitting diode. The dimming driver circuit includes a power converting unit, an input voltage detection unit, an output voltage detection unit, a low-side driving unit and a control unit. The power converting unit includes an input side, an output side and a switch element. The power converting unit receives an input voltage from the input side. During a switching operation of the switch element, the input voltage is converted into an output voltage, and the output voltage is outputted from the output side. The input voltage detection unit is electrically connected with the input side for detecting a voltage value of the input voltage and generating a first detecting signal according to a detecting result of the input voltage detection unit. The output voltage detection unit is electrically connected with the output side for detecting a voltage value of the output voltage and generating a second detecting signal according to a detecting result of the output voltage detection unit. The low-side driving unit is electrically connected with the switch element for driving the switch element. The control unit is electrically connected with the low-side driving unit, the input voltage detection unit and the output voltage detection unit. The control unit previously defines an initial control signal composed of plural pulses at a pulse frequency, the control unit receives and processes a dimming signal so as to generate a corresponding dimming current, and the control unit compares the dimming current with a preset current threshold value. If the dimming current is higher than the preset current threshold value, the control unit calculates an on time period of the switch element in a switching cycle according to the first detecting signal, the second detecting signal and the dimming current and defines a first setting according to the on time period. If the dimming current is lower than or equal to the preset current threshold value, the control unit calculates the on time period of the switch element in the switching cycle according to the first detecting signal, the second detecting signal and the preset current threshold value, divides the switching operation of the switch element into plural chopping cycles, calculates a pulse ratio in at least one chopping cycle according to the dimming current and the preset current threshold value, and defines a second setting according to the on time period and the pulse ratio. The control unit adjusts the plural pulses of the initial control signal according to the first setting or the second setting, so that a corresponding real control signal is generated to the low-side driving unit. The switching operation of the switch element is controlled by the low-side driving unit according to the real control signal. Moreover, an output current corresponding to the dimming signal is generated from the power converting unit to the light emitting diode so as to control the brightness of the light emitting diode.

In accordance with a further aspect of the present invention, there is provided a dimming driver circuit for adjusting brightness of a light emitting diode. The dimming driver circuit includes a power converting unit, an inductor current detecting unit, a low-side driving unit and a control unit. The power converting unit includes an input side, an output side, a first inductor and at least one switch element. The first inductor is electrically connected with an end of the switch element. The power converting unit receives an input voltage from the input side. During a switching operation of the at least one switch element, the input voltage is converted into an output voltage, and the output voltage is outputted from the output side. The inductor current detecting unit is connected with the first inductor. The inductor current detecting unit generates at least one detecting signal according to a result of detecting an inductor current that flows through the first inductor. The low-side driving unit is electrically connected with the switch element for driving the switch element. The control unit is electrically connected with the low-side driving unit and the inductor current detecting unit. The control unit previously defines an initial control signal composed of plural pulses at a pulse frequency, the control unit receives and processes a dimming signal so as to generate a corresponding dimming current, and the control unit compares the dimming current with a preset current threshold value. If the dimming current is higher than the preset current threshold value, the control unit controls the switch element to be switched from the off state to the on state when the detecting signal is equal to a first preset value, controls the switch element to be switched from the on state to the off state when the detecting signal is equal to a second preset value, and defines a first setting. If the dimming current is lower than or equal to the preset current threshold value, the control unit controls the switch element to be switched from the off state to the on state when the detecting signal is equal to the first preset value, controls the switch element to be switched from the on state to the off state when the detecting signal is equal to two times of the preset current threshold value, divides the switching operation of the switch element into plural chopping cycles, calculates a pulse ratio in at least one chopping cycle according to the dimming current and the preset current threshold value, and defines a second setting according to the first preset value, two times of the preset current threshold value and the pulse ratio. The control unit adjusts the plural pulses of the initial control signal according to the first setting or the second setting, so that a corresponding real control signal is generated to the low-side driving unit. The switching operation of the switch element is controlled by the low-side driving unit according to the real control signal. Moreover, an output current corresponding to the dimming signal is generated from the power converting unit to the light emitting diode so as to control the brightness of the light emitting diode.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
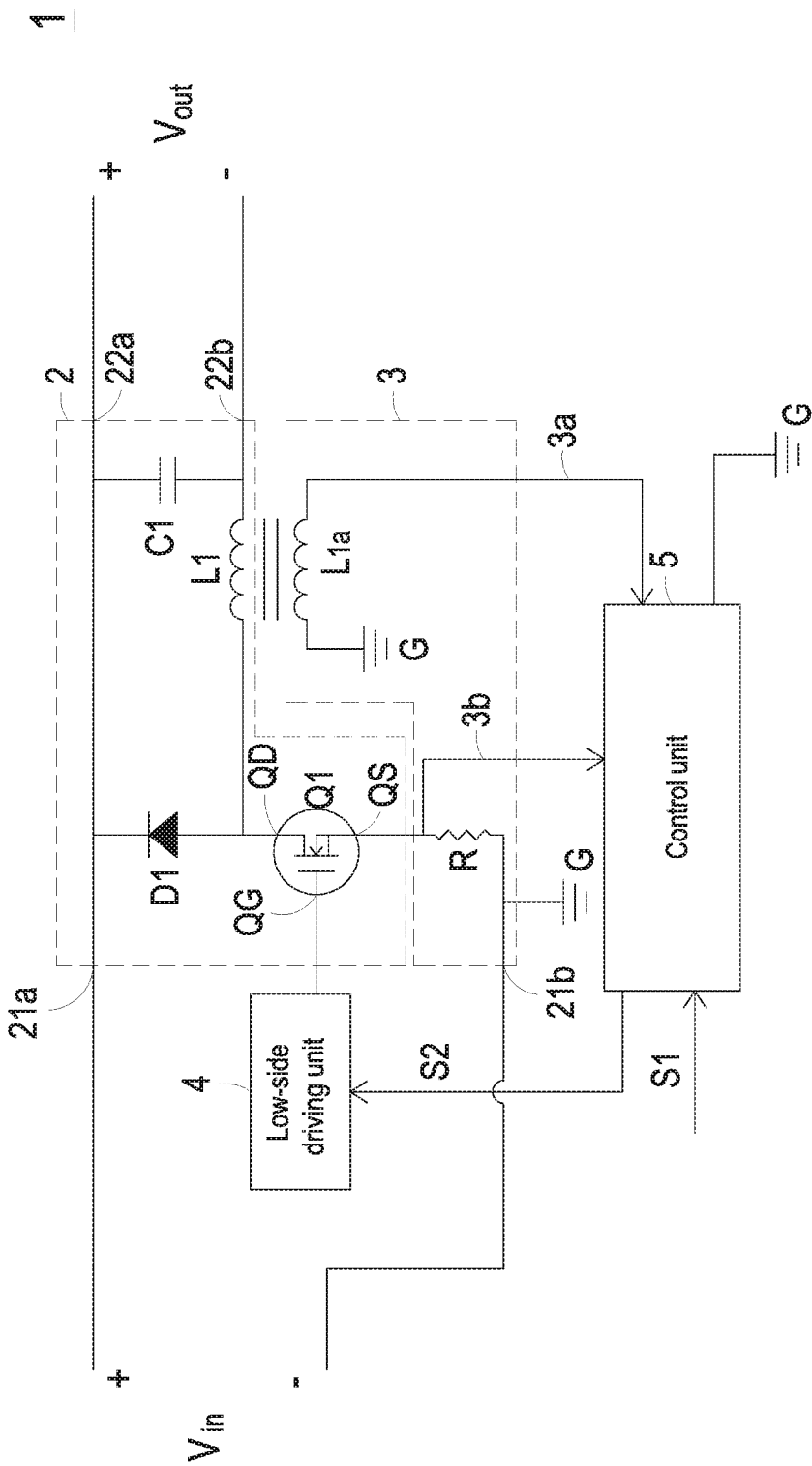
FIG. 1 is a schematic functional block diagram illustrating a dimming driver circuit according to a first embodiment of the present invention.

FIG. 1 is a schematic functional block diagram illustrating a dimming driver circuit according to a first embodiment of the present invention. As shown in FIG. 1, the dimming driver circuit 1 is used for adjusting the brightness of a light-emitting element (not shown in FIG. 1) such as a light emitting diode. The dimming driver circuit 1 comprises a power converting unit 2, an inductor current detecting unit 3, a low-side driving unit 4 and a control unit 5.

The power converting unit 2 comprises an input side, an output side, a first switch element Q1 and a first inductor L1. The input side of the power converting unit 2 comprises a positive input terminal 21a and a negative input terminal 21b. The output side of the power converting unit 2 comprises a positive output terminal 22a and a negative output terminal 22b. The power converting unit 2 receives an input voltage Vin from the input side. By the switching operation of alternately turning on/off the first switch element Q1 in plural switching cycles and by the charging/discharging operation of the first inductor L1, the input voltage Vin is converted into an output voltage Vout. The output voltage Vout is outputted from the output side of the power converting unit 2 to the light-emitting element. Consequently, the illumination of the light-emitting element electrically connected with the power converting unit 2 is driven by the output voltage Vout.

The inductor current detecting unit 3 is connected with the first inductor L1 and electrically connected with the control unit 5. The inductor current detecting unit 3 is used for detecting an inductor current that flows through the first inductor L1 and outputting a detecting signal group according to the detecting result. As shown in FIG. 1, the inductor current detecting unit 3 comprises a coupling winding assembly L1a and a detecting resistor R. The coupling winding assembly L1a is coupled with the first inductor L1. A first end of the coupling winding assembly L1a is electrically connected with a ground terminal G A second end of the coupling winding assembly L1a is electrically connected with the control unit 5. A first end of the detecting resistor R is electrically connected with a first conduction terminal QS of the first switch element Q1 and the control unit 5. A second end of the detecting resistor R is electrically connected with the negative input terminal 21b and the ground terminal G When the inductor current flows through the first inductor L1, a first detecting signal 3a in a proportional relationship to the inductor current is generated because of the coupling between the coupling winding assembly L1a and the first inductor L1. The first detecting signal 3a is transmitted to the control unit 5. The detecting resistor R is used for detecting the increasing current value, i.e., the magnitude of the inductor current in the increasing status. Moreover, a second detecting signal 3b in a proportional relationship to the increasing current value of the inductor current is generated by the detecting resistor R and transmitted to the control unit 5. It is noted that the circuitry of the inductor current detecting unit 3 is not restricted as long as the above functions of the inductor current detecting unit 3 are achieved. For example, in another embodiment, the inductor current detecting unit 3 is a Hall sensor.

The control unit 5 is electrically connected with the low-side driving unit 4 and the inductor current detecting unit 3. The control unit 5 receives a dimming signal S1, the first detecting signal 3a and the second detecting signal 3b. The first detecting signal 3a and the second detecting signal 3b are received from the inductor current detecting unit 3 and collaboratively defined as a detecting signal group. According to the dimming signal S1, the control unit 5 adjusts the brightness of the light-emitting element. Moreover, the control unit 5 outputs a real control signal S2 to the low-side driving unit 4 according to the received signals. The low-side driving unit 4 is electrically connected with a control terminal QG of the first switch element Q1. The low-side driving unit 4 turns on/off the first switch element Q1 according to the real control signal S2. Consequently, the power converting unit 2 generates an output current corresponding to the dimming signal S1 in order to control the brightness of the light-emitting element.

An example of the power converting unit 2 includes but is not limited to a buck converter, a boost converter or a buck-boost converter. For example, as shown in FIG. 1, the power converting unit 2 is a buck converter. The power converting unit 2 comprises a diode D1, the first inductor L1, a capacitor C1 and the first switch element Q1. The first switch element Q1 has the first conduction terminal QS, a second conduction terminal QD and the control terminal QG. For example, the first switch element Q1 is a metal-oxide-semiconductor field-effect transistor (MOSFET). Consequently, the first conduction terminal QS is a source terminal, the second conduction terminal QD is drain terminal, and the control terminal QG is a gate terminal. The control terminal QG of the first switch element Q1 is electrically connected with the low-side driving unit 4. A cathode of the diode D1 is electrically connected with the positive input terminal 21a of the power converting unit 2, a first end of the capacitor C1 and the positive output terminal 22a of the power converting unit 2. An anode of the diode D1 is electrically connected with the second conduction terminal QD of the first switch element Q1 and a first end of the first inductor L1. A second end of the first inductor L1 is electrically connected with a second end of the capacitor C1 and the negative output terminal 22b of the power converting unit 2. The second end of the capacitor C1 is electrically connected with the negative output terminal 22*b* of the power converting unit 2.

Figure 2:
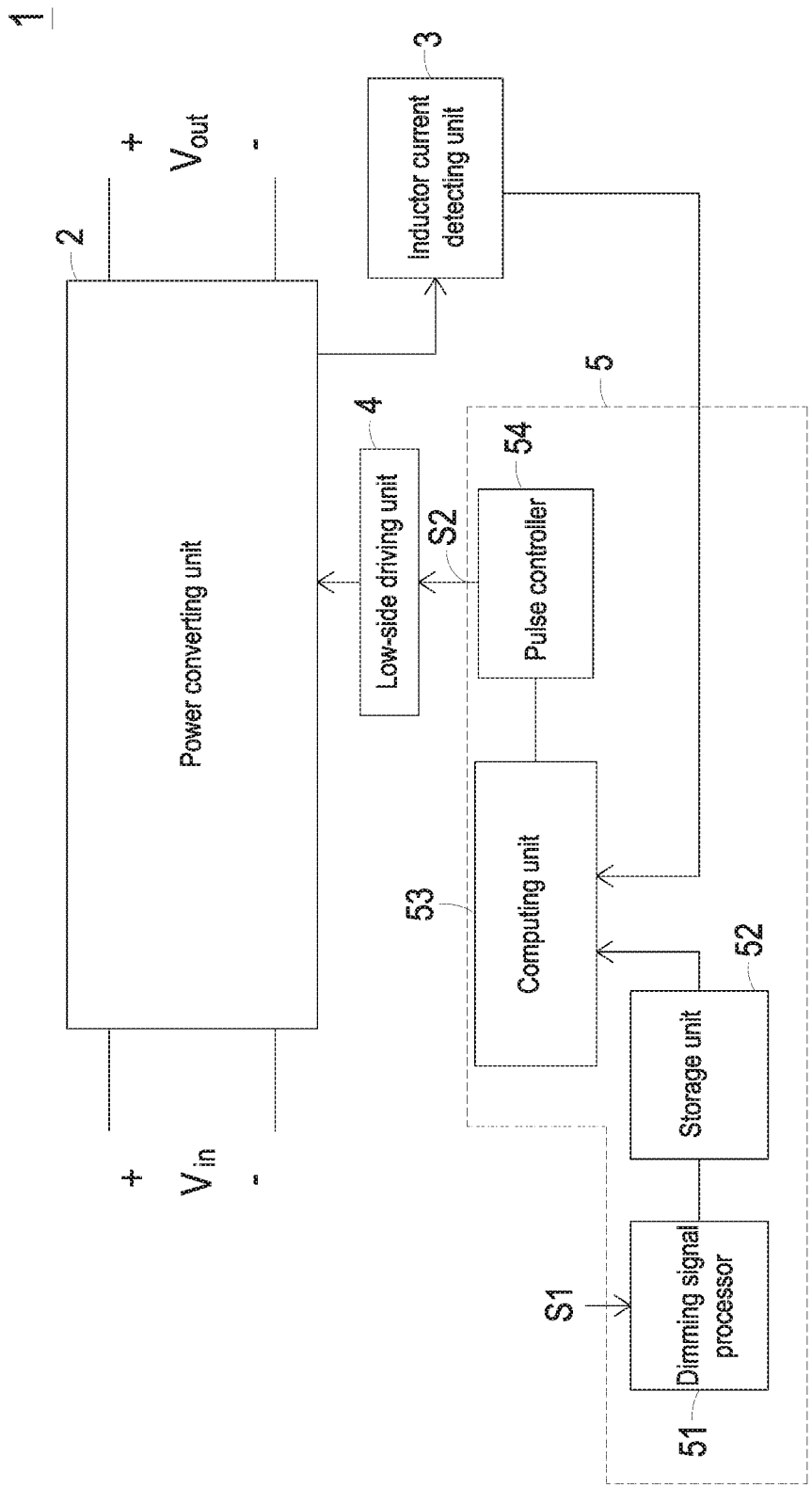
FIG. 2 is a schematic circuit diagram illustrating the detailed circuitry of the control unit of the dimming driver circuit of FIG. 1.

FIG. 2 is a schematic circuit diagram illustrating the detailed circuitry of the control unit of the dimming driver circuit of FIG. 1. As shown in FIG. 2, the control unit 5 comprises a dimming signal processor 51, a storage unit 52, a computing unit 53 and a pulse controller 54. The dimming signal processor 51 receives the dimming signal S1 and generates a corresponding dimming current Idim according to the dimming signal S1. The storage unit 52 is electrically connected with the dimming signal processor 51 in order to store the dimming current Idim. The computing unit 53 is electrically connected with the storage unit 52 and the inductor current detecting unit 3. Moreover, a preset current threshold value Imid is previously stored in the computing unit 53. The computing unit 53 reads the dimming current Idim from the storage unit 52. Moreover, the computing unit 53 compares the dimming current Idim with the preset current threshold value Imid. If the comparing result of the computing unit 53 indicates that the dimming current Idim is higher than the preset current threshold value Imid, the computing unit 53 defines a first setting. According to the first setting, the first switch element Q1 is switched from the off state to the on state when the first detecting signal 3*a* of the detecting signal group is equal to a first preset value, and the first switch element Q1 is switched from the on state to the off state when the second detecting signal 3*b* of the detecting signal group is equal to a second preset value. If the comparing result of the computing unit 53 indicates that the dimming current Idim is lower than or equal to the preset current threshold value Imid, the computing unit 53 defines a second setting. According to the second setting, the first switch element Q1 is switched from the off state to the on state when the first detecting signal 3*a* of the detecting signal group is equal to a first preset value, and the first switch element Q1 is switched from the on state to the off state when the second detecting signal 3*b* of the detecting signal group is equal to two times of the preset current threshold value Imid. Moreover, according to the second setting, the switching operation of the first switch element Q1 is divided into plural chopping cycles by the computing unit 53. Moreover, the computing unit 53 calculates a pulse ratio K in at least one chopping cycle according to the dimming current Idim and the preset current threshold value Imid. Consequently, the second setting is defined according to the first preset value, two times of the preset current threshold value Imid and the pulse ratio K in the at least one chopping cycle. In an embodiment, the first preset value is zero, and the second preset value is two times of the dimming current Idim. It is noted that the first preset value and the second preset value may be varied according to the dimming requirements of the dimming driver circuit 1.

The pulse controller 54 is electrically connected with the computing unit 53. The pulse controller 54 has an initial control signal. Moreover, the pulse controller 54 receives the first setting or the second setting, and adjusts plural pulses of the initial control signal according to the first setting or the second setting. For example, the pulse controller 54 can adjust the pulse width corresponding to the on-state first switch element Q1 by changing the initial control signal, or the pulse controller 54 can increase or decrease the pulse number corresponding to the on-state first switch element Q1 by changing the initial control signal. Consequently, the corresponding real control signal S2 is generated to the low-side driving unit 4.

If the dimming current Idim is lower than or equal to the preset current threshold value Imid, the computing unit 53 calculates the pulse ratio K in the chopping cycle according to the dimming current Idim and the preset current threshold value Imid. Particularly, the pulse ratio is expressed by the following mathematic formula:

$$K = I\text{dim}/I\text{mid} \qquad (1)$$

In the above mathematic formula, K is the pulse ratio in the chopping cycle, Idim is the dimming current, and Imid is the preset current threshold value.

In case that the dimming current Idim is lower than or equal to the preset current threshold value Imid, the computing unit 53 outputs a chopping signal in a specified time interval of the chopping cycle according to the pulse ratio K in the chopping cycle (K=Idim/Imid). If the chopping signal is an invalid signal (e.g., in the low level state) and the inductor current is decreased to the first preset value, the first switch element Q1 is switched from the off state to the on state according to the real control signal S2 under control of the low-side driving unit 4. Whereas, if the inductor current is increased to two times of the preset current threshold value Imid, the first switch element Q1 is switched from the on state to the off state according to the real control signal S2 under control of the low-side driving unit 4. If the chopping signal is a valid signal (e.g., in the high level state), the first switch element Q1 is maintained in the off state according to the real control signal S2 under control of the low-side driving unit 4. If the chopping signal is a valid signal (e.g., in the high level state), the first switch element Q1 is maintained in the off state according to the real control signal S2 under control of the low-side driving unit 4.

As mentioned above, if the dimming signal S1 is higher and the dimming current Idim is higher than the preset current threshold value Imid, the control unit 5 of the dimming driver circuit 1 adjusts the pulse width or the pulse frequency. Consequently, the output current from the power converting unit 2 is adjusted to comply with the dimming signal S1. Whereas, if the dimming signal S1 is lower and the dimming current Idim is lower than or equal to the preset current threshold value Imid, the control unit 5 of the dimming driver circuit 1 chops the pulse number. Consequently, the output current from the power converting unit 2 is adjusted to comply with the dimming signal S1.

Figure 3:
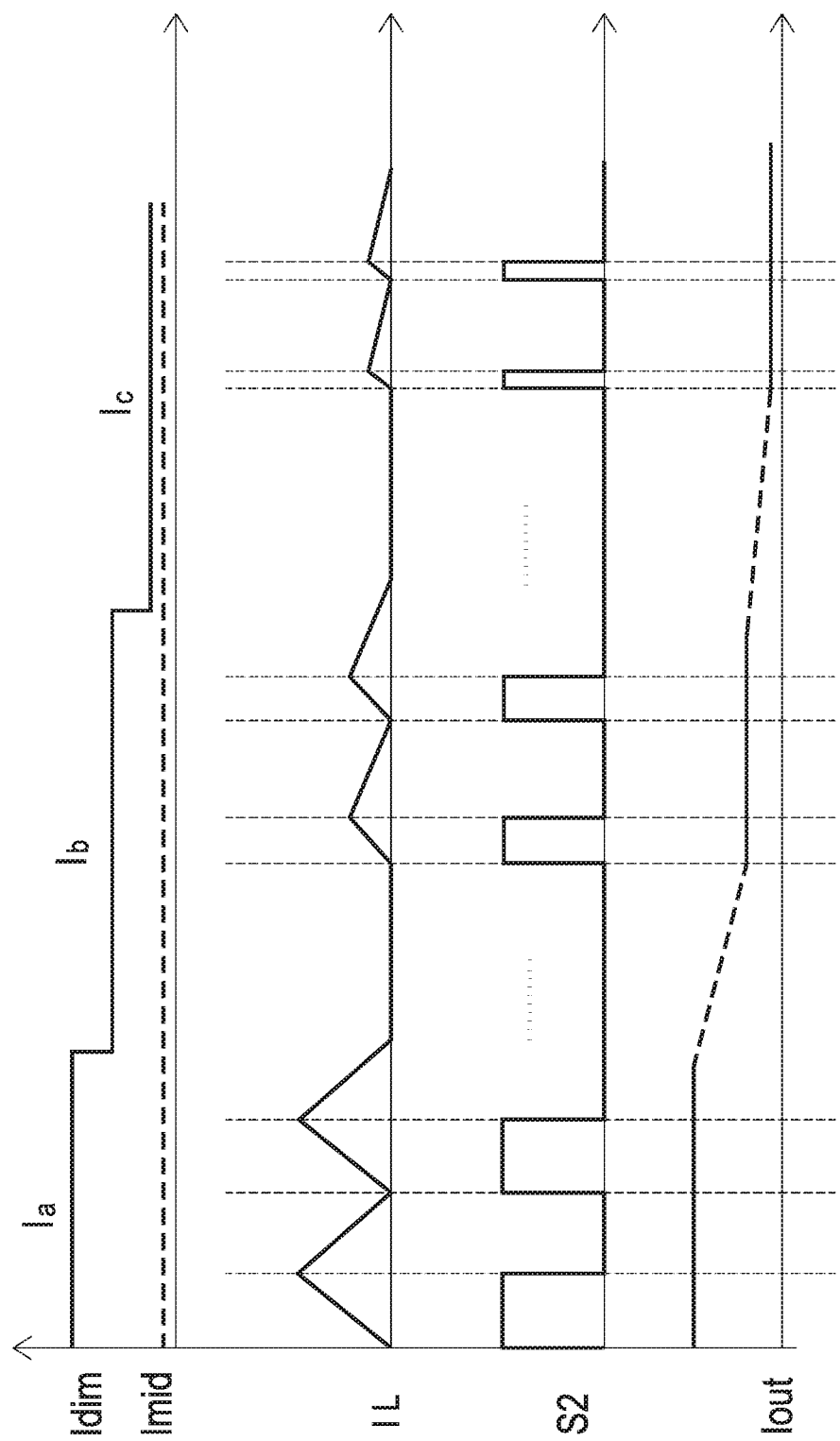
FIG. 3 is a schematic timing waveform diagram illustrating associated signals of the dimming driver circuit of FIG. 1, in which the dimming current corresponding to the dimming signal is higher than the preset current threshold value.

FIG. 3 is a schematic timing waveform diagram illustrating associated signals of the dimming driver circuit of FIG. 1, in which the dimming current corresponding to the dimming signal is higher than the preset current threshold value. If the dimming current Idim corresponding to the dimming signal S1 is higher than the preset current threshold value Imid, each pulse of the real control signal S2 is switched from the zero level state to the high level state when the inductor current IL is decreased to the first preset value (e.g., zero). Consequently, the first switch element Q1 is switched from the off state to the on state. On the other hand, if the dimming current Idim corresponding to the dimming signal Si is higher than the preset current threshold value Imid, each pulse of the real control signal S2 is switched from the high level state to the low level state. Consequently, the first switch element Q1 is switched from the on state to the off state. Moreover, the on time period and the off time period are changed with the dimming current Idim. For example, as shown in FIG. 3, the current value of the dimming current Idim is changed from Ia to Ib and then changed from Ib to Ic (Ia>Ib>Ic>Imid). The time periods of the pulses of the real control signal S2 in the high level state and the low level state (i.e., the on time period and the off time period) are gradually decreased with the decreasing dimming current Idim. Correspondingly, the output current Iout from the power converting unit 2 is gradually decreased.

Figure 4:
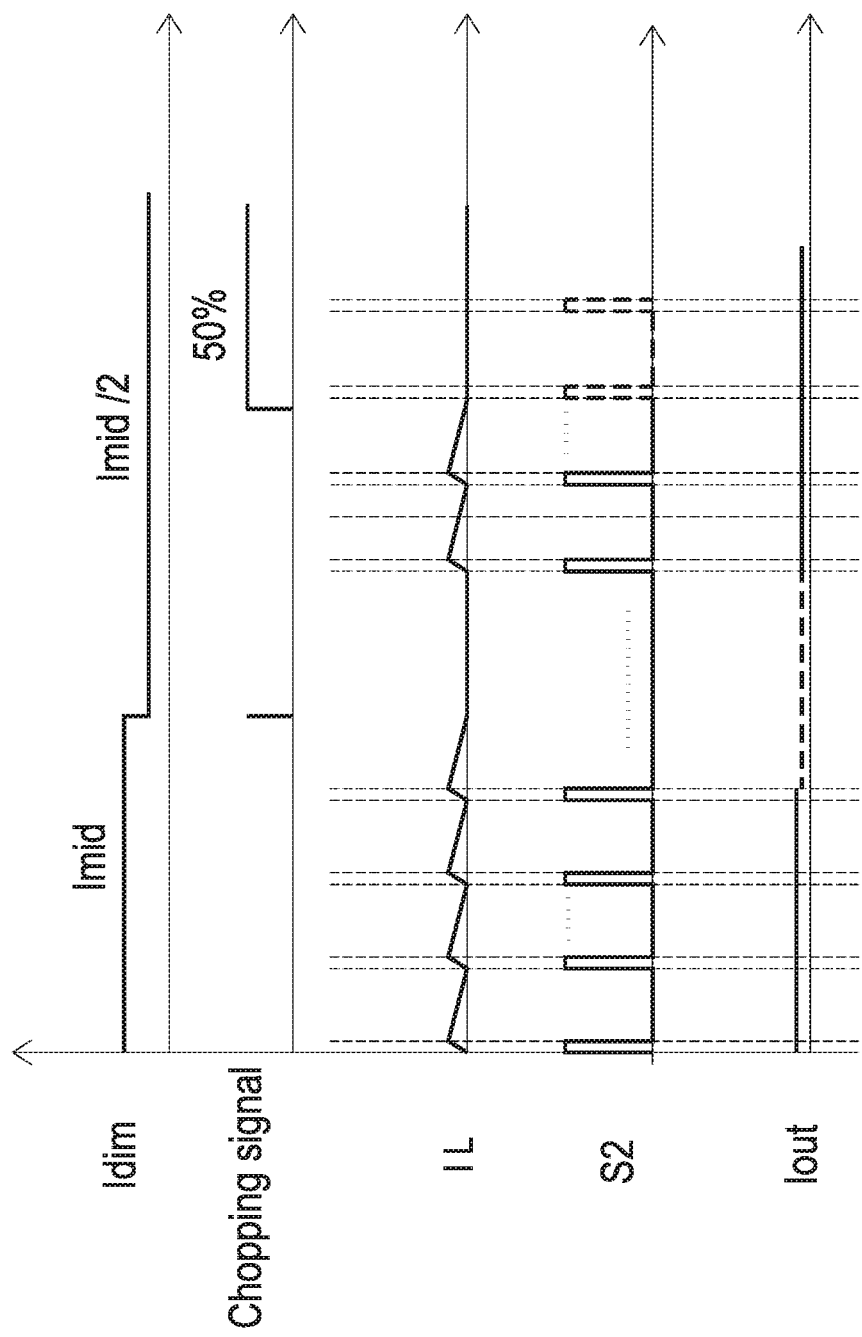
FIG. 4 is a schematic timing waveform diagram illustrating associated signals of the dimming driver circuit of FIG. 1, in which the dimming current corresponding to the dimming signal is lower than or equal to the preset current threshold value.

FIG. 4 is a schematic timing waveform diagram illustrating associated signals of the dimming driver circuit of FIG. 1, in which the dimming current corresponding to the dimming signal is lower than or equal to the preset current threshold value. If the dimming current Idim corresponding to the dimming signal S1 is lower than or equal to the preset current threshold value Imid, the pulse number of the real control signal S2 is chopped according to the change of the dimming current Idim. Please refer to FIG. 4. If the dimming current Idim is equal to the preset current threshold value Imid, the pulse number in one chopping cycle of the real control signal S2 is 4. Once the dimming current Idim is equal to a half of the preset current threshold value (i.e., Idim=Imid/2), the pulse ratio in one chopping cycle of the real control signal S2 is 50% according to the calculation result of the mathematic formula (1) by the computing unit 53. That is, the chopped pulse number corresponding to the second setting is 2. That is, according to the second setting, the pulse controller 54 generates a high-level chopping signal in a specified time interval of the chopping cycle in order to shield two pulses of the real control signal S2. Consequently, the pulse number in one chopping cycle of the real control signal S2 is 2. Meanwhile, the average inductor current IL is decreased, and the output current Iout from the power converting unit 2 is gradually decreased.

Figure 5:
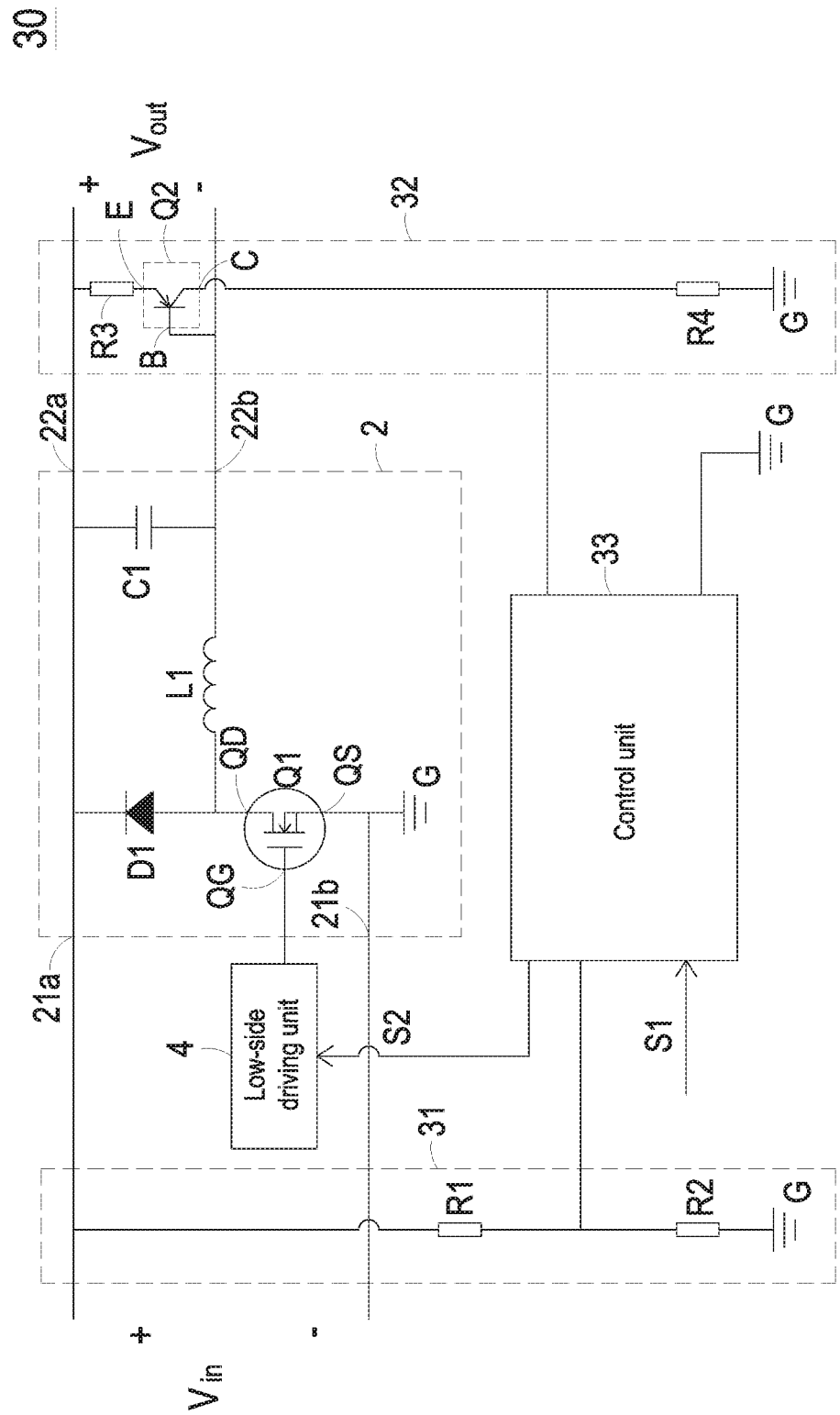
FIG. 5 is a schematic functional block diagram illustrating a dimming driver circuit according to a second embodiment of the present invention.

FIG. 5 is a schematic functional block diagram illustrating a dimming driver circuit according to a second embodiment of the present invention. Component parts and elements corresponding to those of the first embodiment are designated by identical numeral references, and detailed descriptions thereof are omitted. In comparison with the dimming driver circuit 1 of the first embodiment, the dimming driver circuit 30 of this embodiment comprises an input voltage detection unit 31 and an output voltage detection unit 32 in replace of the inductor current detecting unit 3.

The input voltage detection unit 31 is electrically connected with the positive input terminal 21a and the negative input terminal 21b of the power converting unit 2 in order to detect the voltage value of the input voltage Vin. According to the detecting result, the input voltage detection unit 3 generates a first detecting signal. The output voltage detection unit 32 is electrically connected with the positive output terminal 22a and the negative output terminal 22b in order to detect the voltage value of the output voltage Vout. According to the detecting result, the output voltage detection unit 4 generates a second detecting signal.

In this embodiment, the dimming driver circuit 30 comprises the input voltage detection unit 31 and the output voltage detection unit 32. Consequently, the control unit 33 of the dimming driver circuit 30 is electrically connected with the low-side driving unit 4, the input voltage detection unit 31 and the output voltage detection unit 32. The control unit 33 receives the first detecting signal, the second detecting signal and a dimming signal S1. Moreover, an initial control signal composed of plural pulses is previously stored in the control unit 33. The plural pulses are generated at a specified frequency, which is also referred as a pulse frequency. According to the dimming signal S1, the control unit 33 generates a corresponding dimming current Idim. Moreover, the control unit 33 compares the dimming current Idim with a preset current threshold value Imid. If the comparing result of the control unit 33 indicates that the dimming current Idim is higher than the preset current threshold value Imid, the control unit 33 calculates an on time period of the first switch element Q1 in a switching cycle according to the first detecting signal, the second detecting signal and the dimming current Idim and defines a first setting according to the on time period. If the comparing result of the control unit 33 indicates that the dimming current Idim is lower than or equal to the preset current threshold value Imid, the control unit 33 calculates an on time period of the first switch element Q1 in a switching cycle according to the first detecting signal, the second detecting signal and the dimming current Idim. Moreover, the control unit divides the switching operation of the first switch element Q1 into plural chopping cycles, and the control unit 33 calculates a pulse ratio in at least one chopping cycle according to the dimming current Idim and the preset current threshold value Imid. Consequently, the control unit 33 defines a second setting according to the on time period and the pulse ratio in the at least one chopping cycle. Moreover, the control unit 33 receives the first setting or the second setting, and controls the on/off states of the first switch element Q1 according to the first setting or the second setting. For example, the control unit 33 can adjust the pulse width corresponding to the on-state first switch element Q1 by changing the initial control signal, or the control unit 33 can increase or decrease the pulse number corresponding to the on-state first switch element Q1 by changing the initial control signal. Consequently, the corresponding real control signal S2 is generated to the low-side driving unit 4.

The circuitry and the operation of the control unit 33 are similar to those of the control unit 5 of FIG. 2. Similarly, the computing unit of the control unit 33 of this embodiment reads the dimming current Idim from the storage unit and compares the dimming current Idim with the preset current threshold value Imid. However, if the comparing result of the computing unit indicates that the dimming current Idim is higher than the preset current threshold value Imid, the computing unit calculates the on time period of the first switch element Q1 in the switching cycle according to the first detecting signal, the second detecting signal and the dimming current Idim and defines the first setting according to the on time period. If the comparing result of the computing unit indicates that the dimming current Idim is lower than or equal to the preset current threshold value Imid, the computing unit calculates the on time period of the first switch element Q1 in the switching cycle according to the first detecting signal, the second detecting signal and the dimming current Idim. Moreover, the control unit divides the switching operation of the first switch element Q1 into plural chopping cycles, and the computing unit calculates a pulse ratio in at least one chopping cycle according to the dimming current Idim and the preset current threshold value Imid. Consequently, the computing unit defines a second setting according to the on time period and the pulse ratio in the at least one chopping cycle.

The dimming driver circuit 30 of this embodiment is not equipped with the inductor current detecting unit 3. Consequently, the first conduction terminal QS of the first switch element Q1 of the power converting unit 2 is electrically connected with the negative input terminal 21b of the power converting unit 2.

Please refer to FIG. 5 again. The input voltage detection unit 31 comprises a first resistor R1 and a second resistor R2. A first end of the first resistor R1 is electrically connected with the positive input terminal 21a of the power converting unit 2. A second end of the first resistor R1 is electrically connected with a first end of the second resistor R2 and the control unit 33. A first end of the second resistor R2 is also electrically connected with the control unit 33. A second end of the second resistor R2 is electrically connected with the ground terminal G The output voltage detection unit 32 comprises a third resistor R3, a fourth resistor R4 and a second switch element Q2. A first end of the third resistor R3 is electrically connected with the positive output terminal 22a of the power converting unit 2. A first end of the fourth resistor R4 is electrically connected with the ground terminal G A second end of the fourth resistor R4 is electrically connected with the control unit 33. The second switch element Q2 comprises a control terminal B, a third conduction terminal E and a fourth conduction terminal C. The third conduction terminal E is electrically connected with a second end of the third resistor R3. The fourth conduction terminal C is electrically connected with the second end of the fourth resistor R4 and the control unit 33. The control terminal B is electrically connected with the negative output terminal 22b of the power converting unit 2. In this embodiment, the second switch element Q2 is a bipolar junction transistor (BJT). That is, the control terminal B is a base, the third conduction terminal E is an emitter, and the fourth conduction terminal C is a collector.

As shown in FIG. 5, the third resistor R3, the fourth resistor R4 and the second switch element Q2 of the output voltage detection unit 32 are collaboratively defined as a voltage divider. That is, after the output voltage Vout is subjected to a voltage division, the output voltage Vout is proportionally decreased and thus the second detecting signal is generated. Consequently, the voltage value of the second detecting signal received by the control unit 33 is equal to (Vout−Vbe)×R4/R3. In this formula, Vbe is a forward bias voltage of the second switch element Q2, Vout is the output voltage, R4 is the resistance of the fourth resistor, and R3 is the resistance of the third resistor. Similarly, another voltage divider is defined by the first resistor R1 and the second resistor R2 of the input voltage detection unit 31 collaboratively. That is, after the input voltage Vin is subjected to a voltage division, the input voltage Vin is proportionally decreased and thus the first detecting signal is generated.

Figure 6A:
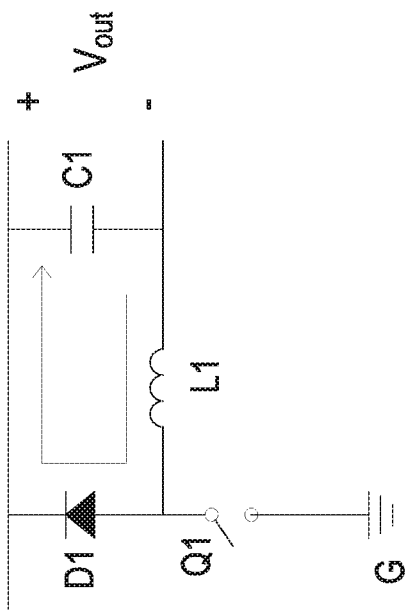
FIG. 6A schematically illustrates the first switch element of the dimming driver circuit of FIG. 5 in an on state.
Figure 6B:
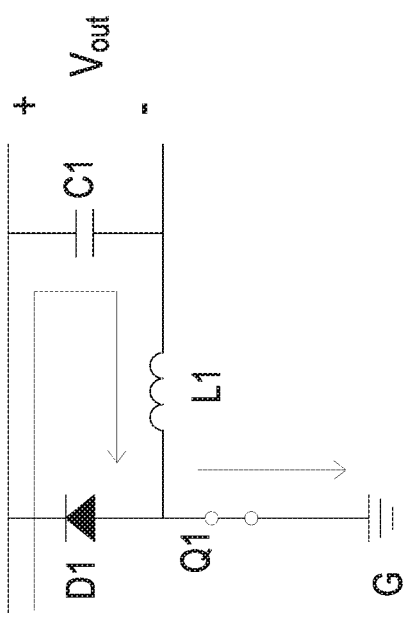
FIG. 6B schematically illustrates the first switch element of the dimming driver circuit of FIG. 5 in an off state.
Figure 7:
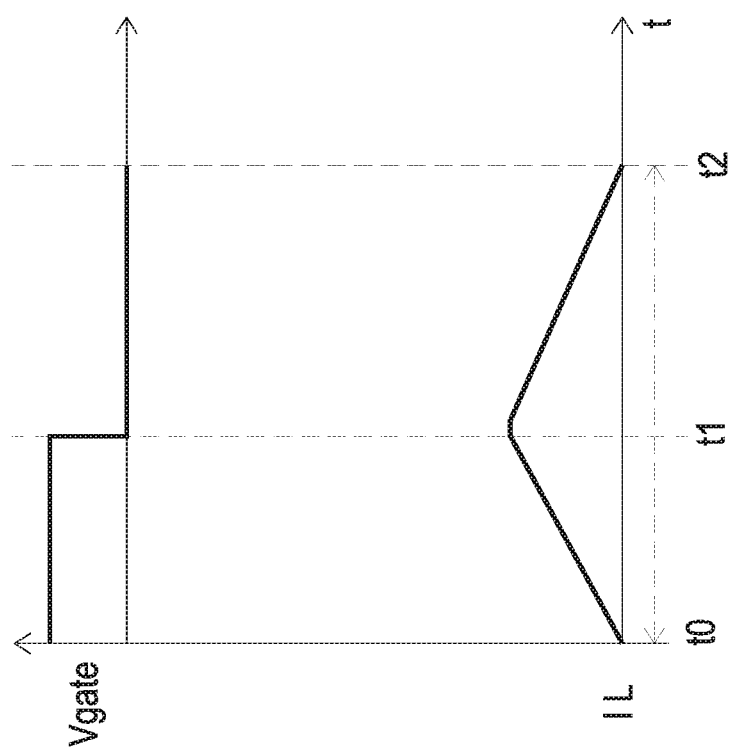
FIG. 7 is a schematic timing waveform diagram illustrating associated signals of the dimming driver circuit according to the second embodiment of the present invention.

FIG. 6A schematically illustrates the first switch element of the dimming driver circuit of FIG. 5 in an on state. FIG. 6B schematically illustrates the first switch element of the dimming driver circuit of FIG. 5 in an off state. FIG. 7 is a schematic timing waveform diagram illustrating associated signals of the dimming driver circuit according to the second embodiment of the present invention. When the first switch element Q1 is turned on, the current in the power converting unit 2 flows along a direction as shown in FIG. 6A. That is, the current flows to the ground terminal G through the capacitor C1, the inductor L1 and the first switch element Q1. Meanwhile, the inductor L1 is charged. As shown in FIG. 7, in the time interval between t0 and t1, the control voltage Vgate at the control terminal QG of the first switch element Q1 is in a high level state. Consequently, the first switch element Q1 is in the on state. Meanwhile, the inductor L1 is charged, and the inductor current IL of the first inductor L1 is gradually increased. The inductor current IL of the first inductor L1 can be expressed by the following formulae:

$$IL_{on}(t)=(Vin-Vout)*t/L \quad (2)$$

$$Ipk=(Vin-Vout)\times Ton/L \quad (3)$$

In the above formulae, $IL_{on}(t)$ is a function of time for the inductor current flowing through the first inductor L1 when the first switch element Q1 in the on state, Ipk is a current value of the first inductor L1 at the time point t1, Vin is a voltage value of the input voltage, Vout is a voltage value of the output voltage, $T_{on}$ is the on time period of the first switch element Q1 in the switching cycle, and L is the inductance of the first inductor L1.

When the first switch element Q1 is turned off, the first inductor L1 discharges, and the current in the power converting unit 2 flows along a direction as shown in FIG. 6B. That is, the current flows from the first inductor L1 to the capacitor C1 through the anode of the diode D1 and the cathode of the diode D1. As shown in FIG. 7, in the time interval between t1 and t2, the control voltage Vgate at the control terminal QG of the first switch element Q1 is in a low level state.

Consequently, the first switch element Q1 is in the off state. Meanwhile, the first inductor L1 discharges, and the inductor current IL of the first inductor L1 is gradually decreased. The inductor current IL of the first inductor L1 can be expressed by the following formulae:

$$IL_{off}(t)=Ipk-Vout*t/L \quad (4)$$

$$IL_{T\_off}=Ipk-Vout\times T_{off}/L \quad (5)$$

In the above formulae, $IL_{off}(t)$ is a function of time for the current flowing through the first inductor L1 when the first switch element Q1 in the off state, $IL_{T\_off}$ is a current value of the first inductor L1 at the time point t1, and $T_{off}$ is the off time period of the first switch element Q1 in the switching cycle. When the power converting unit 2 is operated in a discontinuous current mode, $IL_{T\_off}=0$. Consequently, the following formula is obtained:

$$Iout = I_{avg} = \frac{Ton\times(Vin-Vout)}{2\times L} \times \frac{Ton+Ton\times(Vin-Vout)}{\frac{1}{fs}} \quad (6)$$

In the above formulae, $IL_{avg}$ is the average current flowing through the first inductor L1 in the switching cycle, fs is a pulse frequency, and Iout is the output current of the power converting unit 2.

In the formula (6), the inductance L of the inductor L1 and the pulse frequency fs are constant values, and the voltage value of the input voltage Vin, the voltage value of the output voltage Vout and the on time period Ton of the first switch element Q1 are variable values. Consequently, the output current Iout is related to the voltage value of the input voltage Vin, the voltage value of the output voltage Vout and the on time period Ton of the first switch element Q1.

The on time period Ton may be calculated by the following formula:

$$Ton = \sqrt{Idim\times \frac{2\times L}{VinAD-VoutAD} \times \frac{\frac{1}{fs}}{1+\frac{(VinAD-VoutAD)}{VoutAD}}} \quad (7)$$

In the above formula: Idim is the reference current corresponding to the dimming signal S1, VinAD is the first detecting signal, and VoutAD is the second detecting signal. Moreover, Idim is a variable value.

From the formula (7), the on time period Ton of the first switch element Q1 in the switching cycle is obtained according to the dimming current corresponding to the dimming signal S1, the input voltage Vin and the output voltage Vout. In case that the input voltage Vin and the output voltage Vout are constant voltages, the output current from the power converting unit 2 is determined according to the on time period. Consequently, if the on time period is fixed, the output current is fixed. Under this circumstance, the output current is controlled in a constant-current control manner. From the formula (6), if the dimming current Idim corresponding to the dimming signal S1 is reduced, the on time period and the output current are also reduced. Consequently, the output current is determined according to the input voltage Vin, the output voltage Vout and the dimming current Idim corresponding to the dimming signal S1. Under this circumstance, the brightness of the light emitting diode can be adjusted without the need of detecting the output current of the power converting unit 2.

Figure 8:
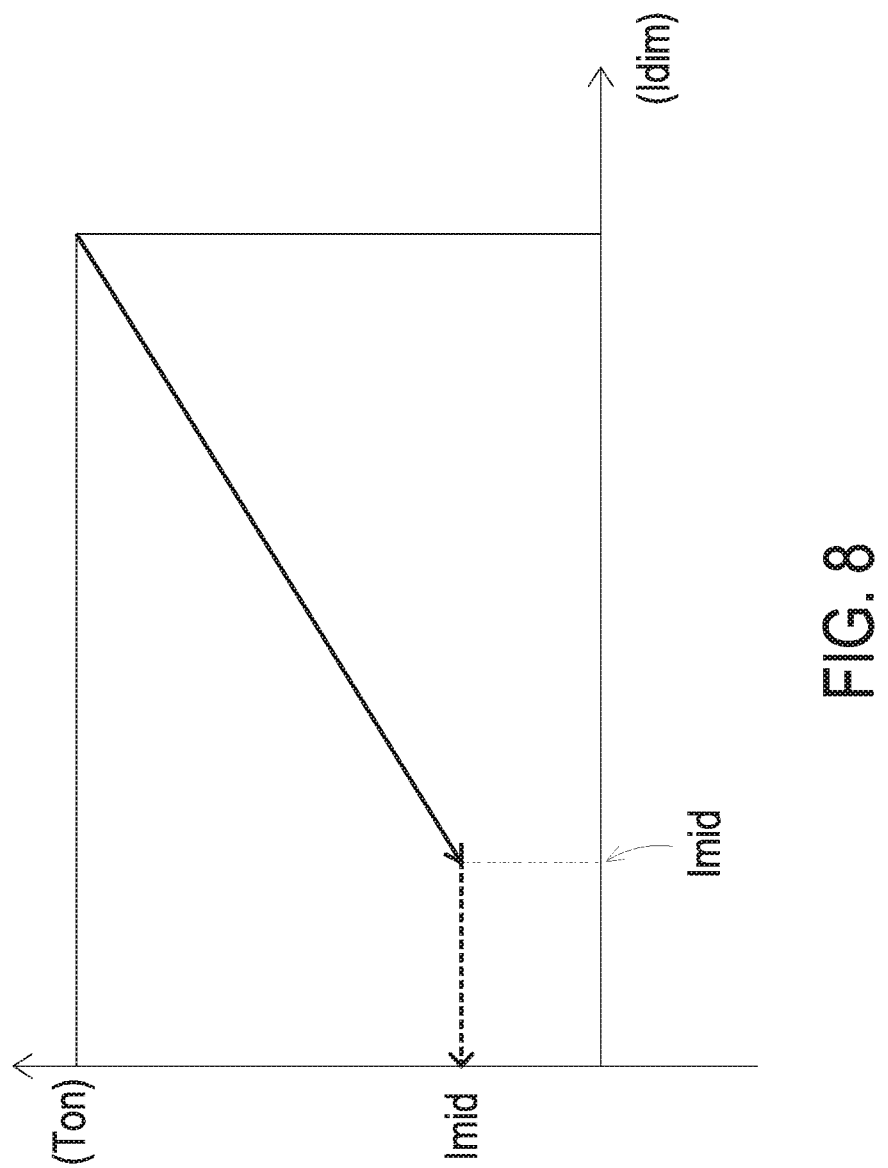
FIG. 8 is a plot illustrating the relationship between the on time period of the first switch element and the dimming current corresponding to the dimming signal by using the dimming driver circuit of FIG. 5.

FIG. 8 is a plot illustrating the relationship between the on time period of the first switch element and the dimming current corresponding to the dimming signal by using the dimming driver circuit of FIG. 5. If the computing unit of the control unit 33 judges that the dimming current Idim stored in the storage unit is higher than the preset current threshold value Imid, the on time period Ton calculated by the computing unit and the dimming current Idim are in a linear relationship. That is, the on time period of the first switch element Q1 in the switching cycle is adjusted according to the change of the dimming signal S1. Whereas, if the computing unit judges that the dimming current Idim stored in the storage unit is lower than or equal to the preset current threshold value Imid, the on time period calculated by the computing unit is a fixed value, which is equal to the on time period corresponding to the preset current threshold value Imid.

Figure 9:
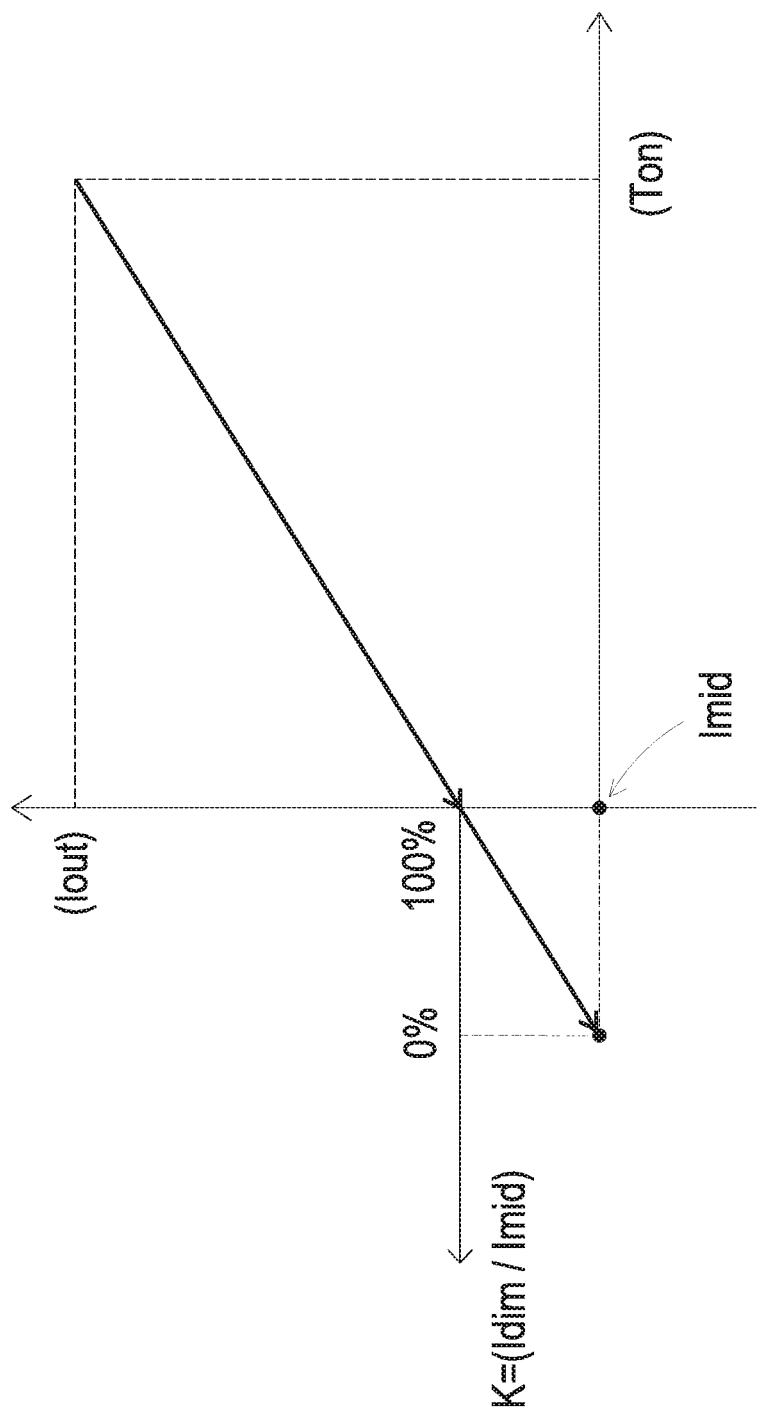
FIG. 9 is a plot illustrating the relationship between the on time period of the first switch element and the output current by using the dimming driver circuit of FIG. 5.

FIG. 9 is a plot illustrating the relationship between the on time period of the first switch element and the output current by using the dimming driver circuit of FIG. 5. If the computing unit of the control unit 33 judges that the dimming current Idim stored in the storage unit is higher than the preset current threshold value Imid, the output current Iout from the power converting unit 2 and the dimming current Idim are in a linear relationship. Whereas, if the computing unit judges that the dimming current Idim stored in the storage unit is lower than or equal to the preset current threshold value Imid, the computing unit calculates the pulse ratio K according to the dimming current Idim corresponding to the trimming signal S1. In fact, the pulse ratio K is equal to Idim/Imid. As shown in FIG. 9, the pulse ratio K is in the range between 0% and 100%. Generally, as the pulse ratio is decreased, the output current Iout from the power converting unit 2 is decreased. Consequently, if the dimming current Idim is lower than or equal to the preset current threshold value Imid, the output current from the power converting unit 2 is adjusted to comply with the dimming signal S1 by controlling the pulse number of the real control signal S2.

Figure 10:
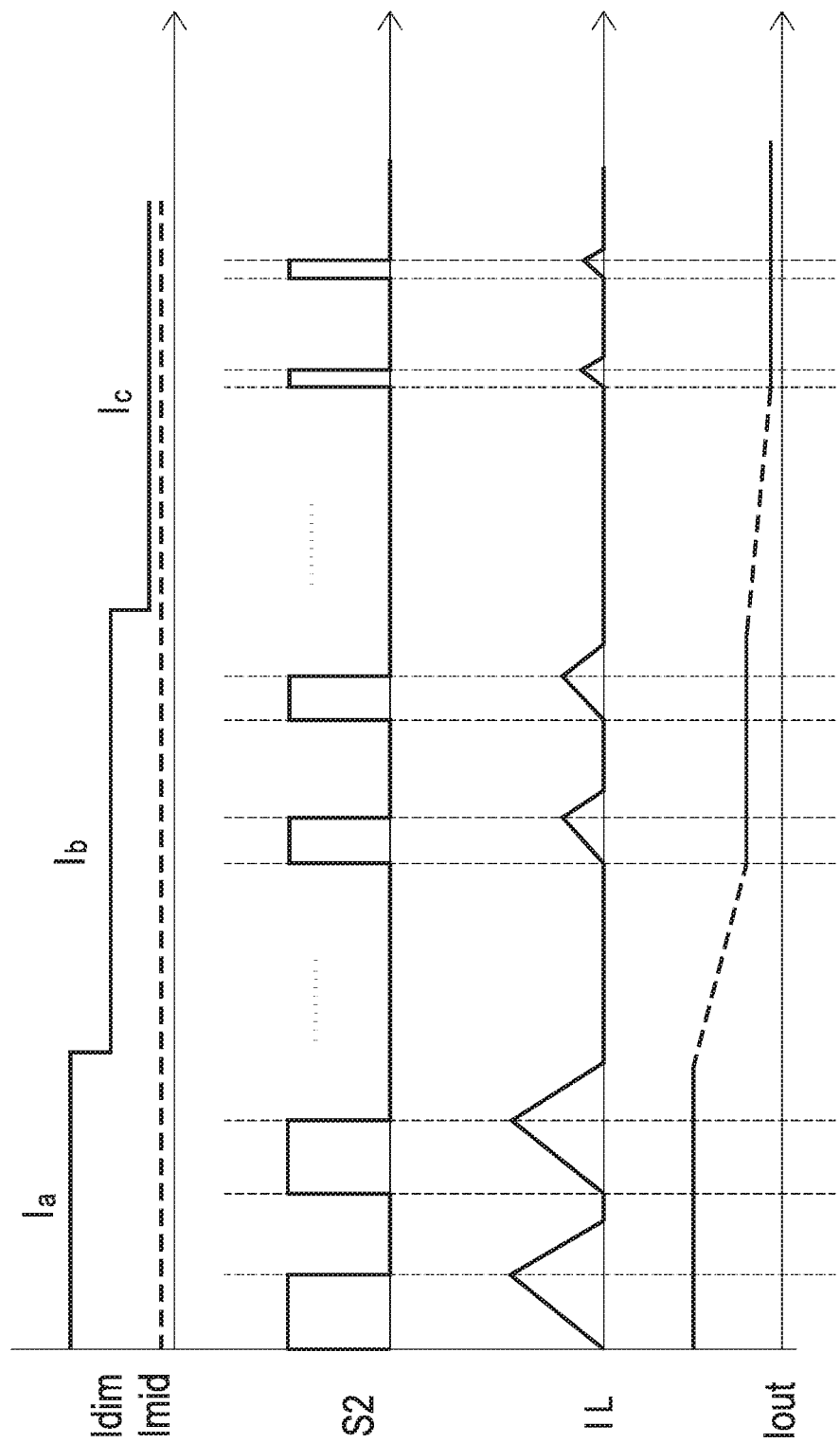
FIG. 10 is a schematic timing waveform diagram illustrating associated signals of the dimming driver circuit, in which the dimming current corresponding to the dimming signal is higher than the preset current threshold value.

FIG. 10 is a schematic timing waveform diagram illustrating associated signals of the dimming driver circuit, in which the dimming current corresponding to the dimming signal is higher than the preset current threshold value. If the dimming current Idim corresponding to the dimming signal Si is higher than the preset current threshold value Imide, the width of each pulse of the real control signal S2 is changed with the dimming current Idim. For example, as shown in FIG. 10, the current value of the reference current Idim is changed from Ia to Ib and then changed from Ib to Ic (Ia>Ib>Ic>Imid). Consequently, the width of each pulse of the real control signal S2 (i.e., the on time period Ton) is decreased with the decreasing dimming current Idim, and the inductor current IL flowing through the first inductor L1 and the output current Iout from the power converting unit 2 are correspondingly decreased.

Figure 11:
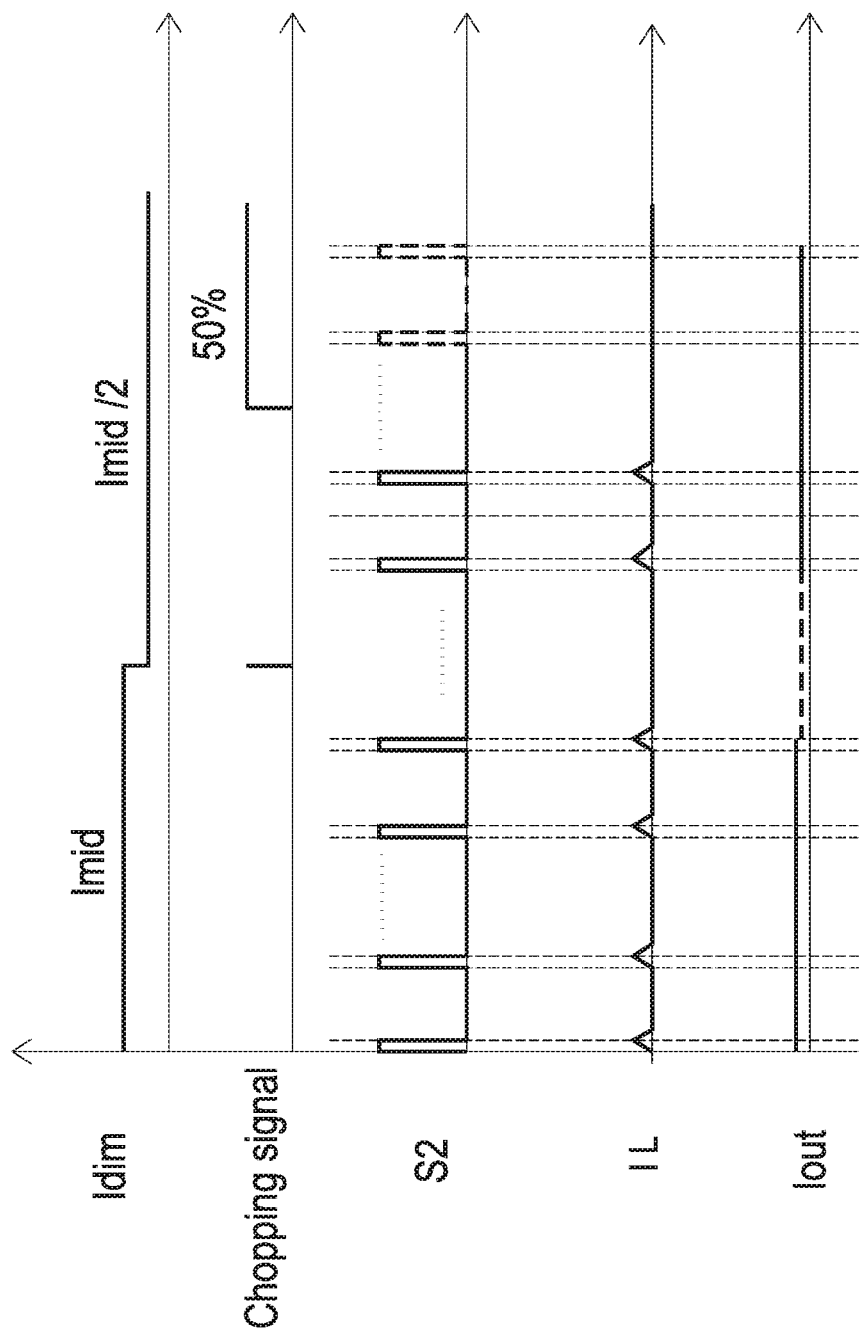
FIG. 11 is a schematic timing waveform diagram illustrating associated signals of the dimming driver circuit of FIG. 5, in which the dimming current corresponding to the dimming signal is lower than or equal to the preset current threshold value.

FIG. 11 is a schematic timing waveform diagram illustrating associated signals of the dimming driver circuit of FIG. 5, in which the dimming current corresponding to the dimming signal is lower than or equal to the preset current threshold value. If the dimming current Idim corresponding to the dimming signal S1 is lower than or equal to the preset current threshold value Imid, the pulse number of the real control signal S2 is chopped according to the change of the dimming current Idim. Please refer to FIG. 11. If the dimming current Idim is equal to the preset current threshold value Imid, the pulse number in one chopping cycle of the real control signal S2 is 4. Once the dimming current Idim is equal to a half of the preset current threshold value (i.e., Idim=Imid/2), the pulse ratio in one chopping cycle of the real control signal S2 is 50% according to the calculation result of the mathematic formula (1) by the computing unit. That is, the chopped pulse number corresponding to the second setting is 2. That is, according to the second setting, the pulse controller generates a high-level chopping signal in a specified time interval of the chopping cycle in order to shield two pulses of the real control signal S2. Consequently, the pulse number in one chopping cycle of the real control signal S2 is 2. The inductor current IL of the first inductor L1 in the first two pulses of the chopping cycle is equal to the current of the first inductor L1 in the situation that the dimming current Idim is equal to the preset current threshold value Imid. The inductor current IL of the first inductor L1 in the last two pulses of the chopping cycle is zero because the last two pulses are shielded. Meanwhile, the average inductor current IL is decreased, and the output current Iout from the power converting unit 2 is gradually decreased. As mentioned above, because of the chopping modulation of the pulse number in a chopping cycle, the dimming driver circuit can further reduce the output current of the power converting unit 2.

Figure 12:
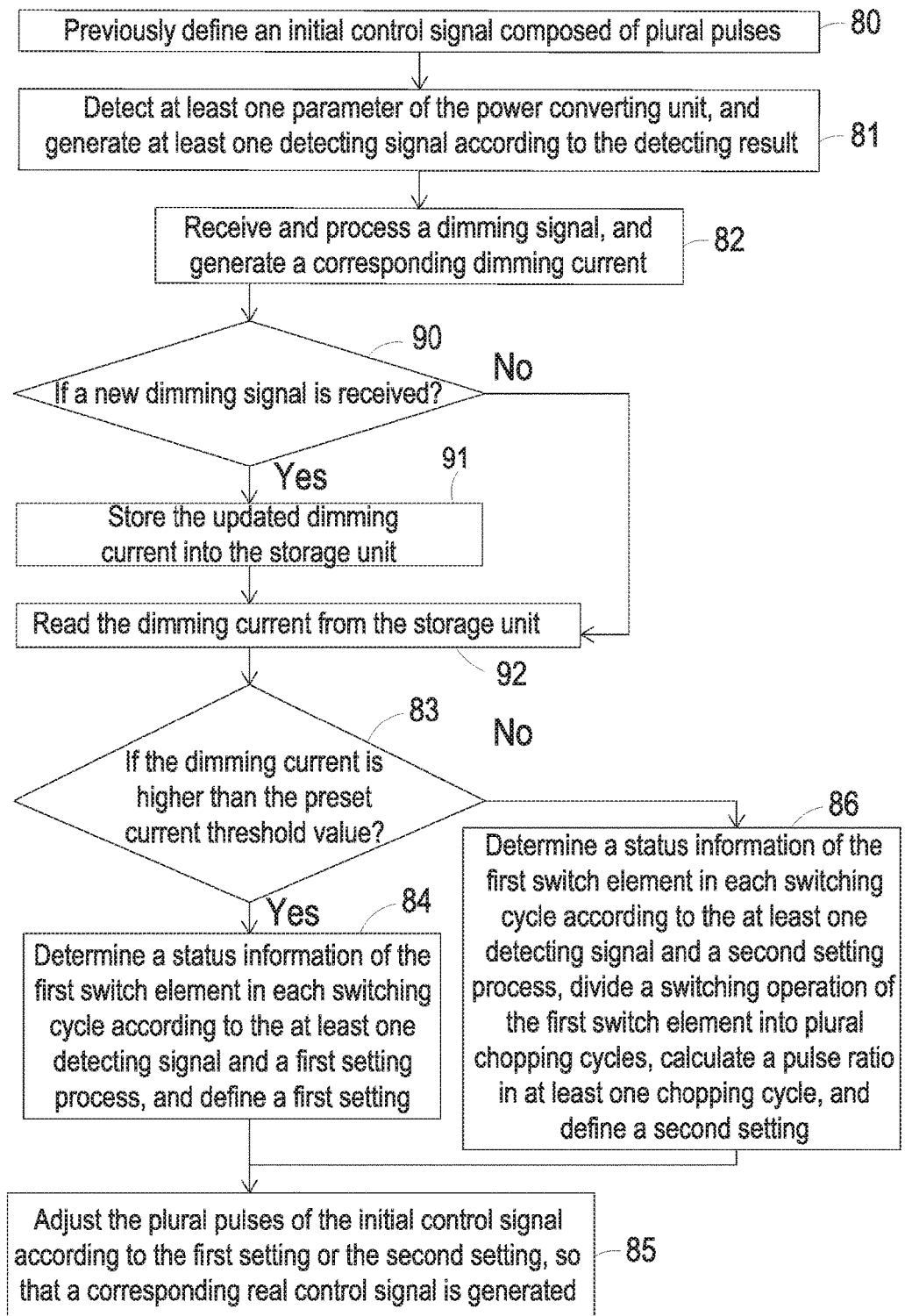
FIG. 12 is a flowchart illustrating a control method for the dimming driver circuit of FIG. 1 or the dimming driver circuit FIG. 5.

FIG. 12 is a flowchart illustrating a control method for the dimming driver circuit of FIG. 1 or the dimming driver circuit FIG. 5. Firstly, in a step 80, an initial control signal composed of plural pulses is previously defined. The plural pulses are generated according to a pulse frequency. Moreover, the first switch element Q1 is turned on in a switching cycle corresponding to each pulse. Then, in a step 81, at least one parameter of the power converting unit 2 is detected, and at least one detecting signal is generated according to the detecting result. Then, in a step 82, a dimming signal S1 is received and processed, and thus a corresponding dimming current Idim is generated. Then, a step 83 is performed to judge whether the dimming current Idim is higher than a preset current threshold value Imid. If the result of the step 83 indicates that the dimming current Idim is higher than the preset current threshold value Imid, the step 84 is performed. In the step 84, a status information of the first switch element Q1 in each switching cycle is determined according to the at least one detecting signal and a first setting process, and thus a first setting is defined. If the result of the step 83 indicates that the dimming current Idim is lower than or equal to the preset current threshold value Imid, the step 86 is performed. In the step 86, a status information of the first switch element Q1 in each switching cycle is determined according to the at least one detecting signal and a second setting process, a switching operation of the first switch element Q1 is divided into plural chopping cycles, and a pulse ratio in at least one chopping cycle is calculated according to the dimming current Idim and the preset current threshold value Imid. Consequently, the second setting is defined. After the step 84 or the step 86 is performed, a step 85 is performed. In the step 85, the plural pulses of the initial control signal are adjusted according to the first setting or the second setting, so that a corresponding real control signal S2 is generated. The operation of the first switch element Q1 is controlled according to the real control signal S2. Consequently, an output current corresponding to the dimming signal S1 is generated from the power converting unit 2 to the light-emitting element in order to control the brightness of the light-emitting element.

In an embodiment, the control method is applied to the dimming driver circuit 1 of FIG. 1. In the step 81, the parameter indicates the inductor current flowing through the inductor current detecting unit 3, and the at least one detecting signal contains the first detecting signal 3*a* from the coupling winding assembly L1*a* and the second detecting signal 3*b* from the detecting resistor R. In the step 84 or the step 86, the status information denotes the on state and the off state of the first switch element Q1 in each switching cycle. In accordance with the first setting process, the first switch element Q1 is switched from the off state to the on state when the first detecting signal 3*a* of the detecting signal group is equal to a first preset value, and the first switch element Q1 is switched from the on state to the off state when the second detecting signal 3*b* of the detecting signal group is equal to a second preset value. In accordance with the second setting process, the first switch element Q1 is switched from the off state to the on state when the first detecting signal 3*a* of the detecting signal group is equal to the first preset value, and the first switch element Q1 is switched from the on state to the off state when the second detecting signal 3*b* of the detecting signal group is equal to two times of the preset current threshold value Imid.

In another embodiment, the control method is applied to the dimming driver circuit 30 of FIG. 5. In the step 81, the parameter indicates the voltage value of the input voltage Vin detected by the input voltage detection unit 31 and the voltage value of the output voltage detected by the output voltage detection unit 32, and the at least one detecting signal contains the first detecting signal from the input voltage detection unit 31 and the second detecting signal from the output voltage detection unit 32. In the step 84 or the step 86, the status information denotes the on time period of the first switch element Q1 in the switching cycle. In accordance with the first setting process, the control unit 33 calculates the on time period of the first switch element Q1 in the switching cycle according to the first detecting signal, the second detecting signal and the dimming current Idim. In accordance with the second setting process, the control unit 33 calculates the on time period of the first switch element Q1 in the switching cycle according to the first detecting signal, the second detecting signal and the preset current threshold value Imid.

In some embodiments, the control method further comprises steps 90, 91 and 92 between the steps 82 and 83. After the step 82, the dimming signal processor 51 performs the step 90 of judging whether a new dimming signal S1 is received and determining whether the dimming current Idim is updated. If the judging condition of the step 90 is satisfied, the step 91 is performed. In the step 91, the updated dimming current Idim corresponding to the new dimming signal S1 is stored into the storage unit 52. Then, in the step 92, the computing unit 53 reads the dimming current Idim from the storage unit 52. Then, the step 83 is performed. If the judging condition of the step 90 is not satisfied, the step 92 is performed directly.

Figure 13:
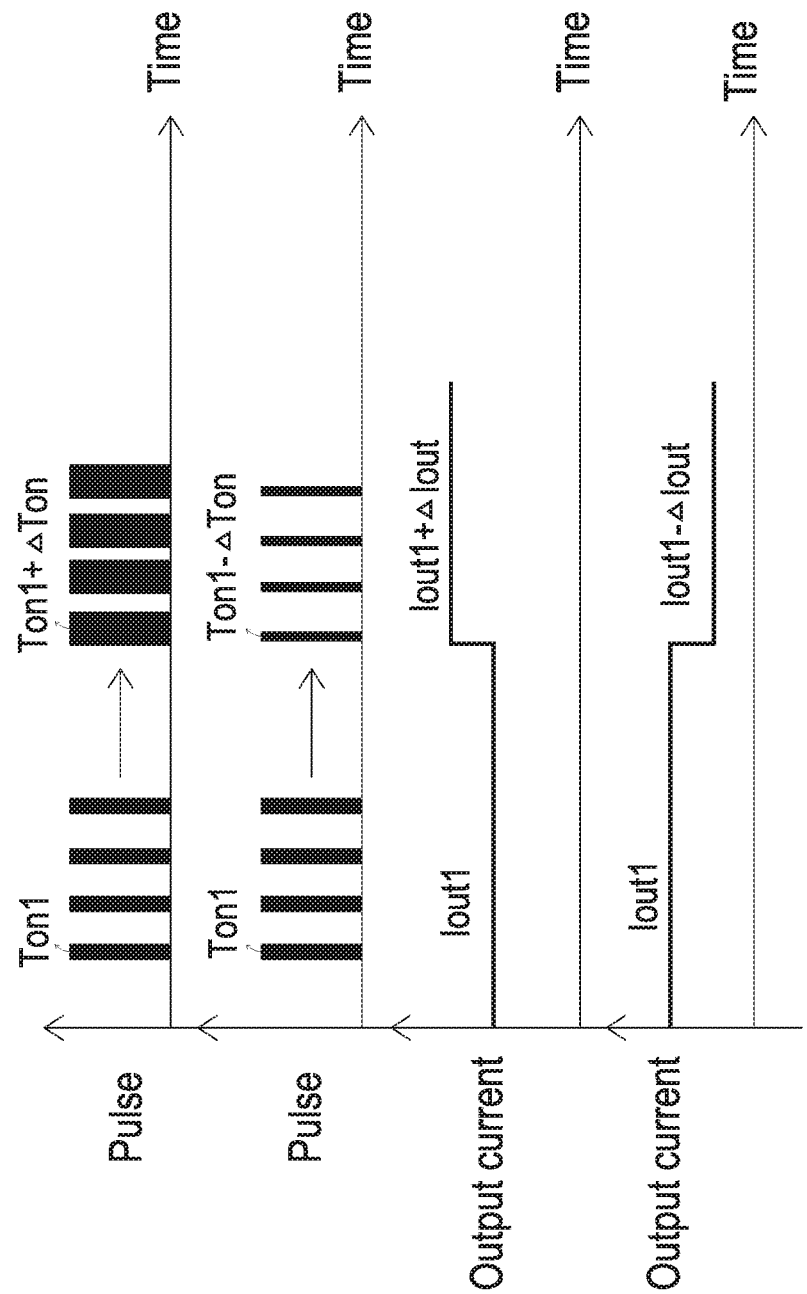
FIG. 13 is an exemplary timing waveform diagram illustrating associated signals of the dimming driver circuit adjusted by the control method of FIG. 12, in which the pulses of the real control signal is adjusted and the dimming current is higher than the preset current threshold value.

FIG. 13 is an exemplary timing waveform diagram illustrating associated signals of the dimming driver circuit adjusted by the control method of FIG. 12, in which the pulses of the real control signal is adjusted and the dimming current is higher than the preset current threshold value. As shown in FIG. 13, the dimming current Idim is higher than the preset current threshold value Imid. In the step 85, the width of each pulse of the real control signal S2 is adjusted according to the first setting.

As shown in the left side of FIG. 13, the original width of each pulse of the real control signal S2 is equal to Ton1, and the average output current from the power converting unit 2 is equal to Iout1. If the dimming signal S1 is changed and the dimming current Idim is higher than the preset current threshold value Imid, the control unit 5 of the dimming driver circuit 1 of FIG. 1 or the control unit 33 of the dimming driver circuit 30 of FIG. 5 will increase or decrease the pulse width by $\Delta$Ton according to the first setting. The current change corresponding to $\Delta$Ton is equal to $\Delta$Iout. In accordance with the control method of the present invention, the pulse width of the real control signal S2 is increased or decreased by $\Delta$Ton. Consequently, the output current from the power converting unit 2 is changed from Iout1 to Iout1+$\Delta$Iout or Iout1−$\Delta$Iout.

Figure 14:
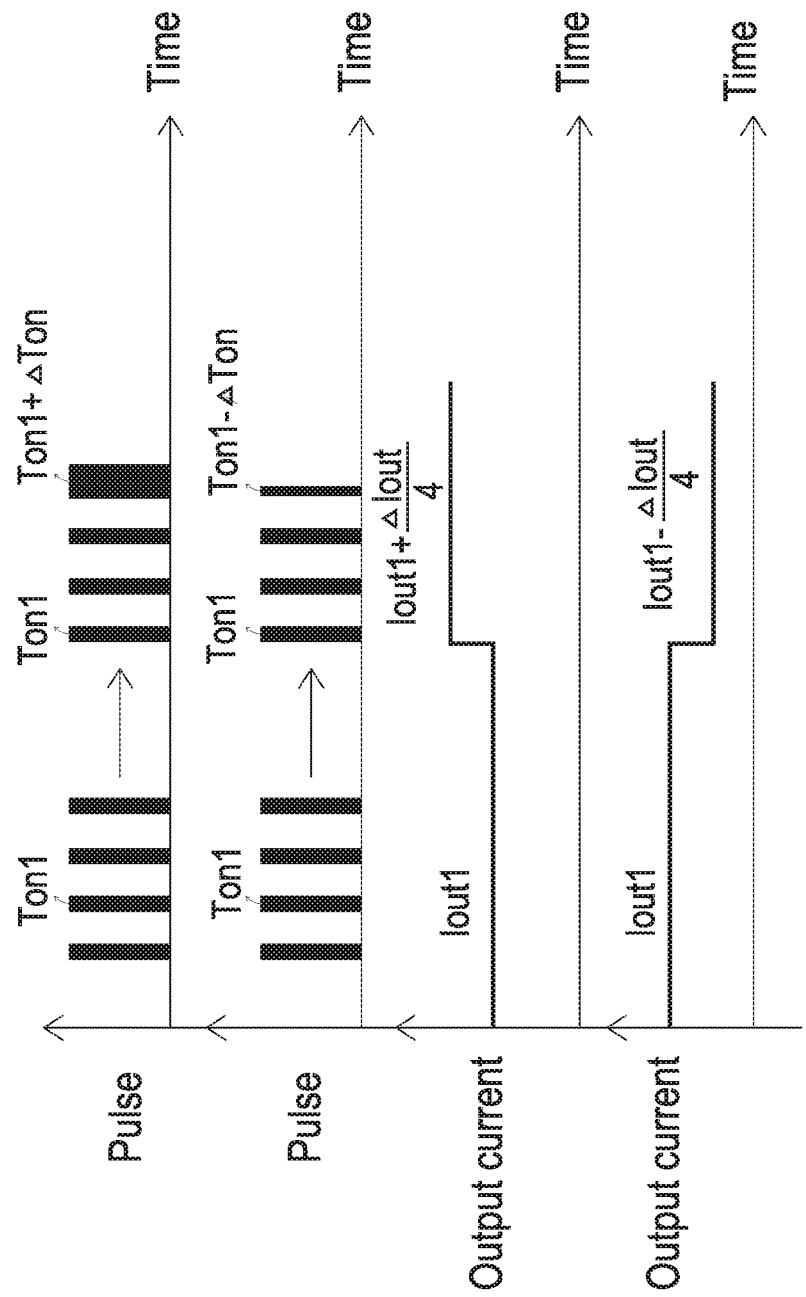
FIG. 14 is another exemplary timing waveform diagram illustrating associated signals of the dimming driver circuit adjusted by the control method of FIG. 12, in which the pulses of the real control signal is adjusted and the dimming current is higher than the preset current threshold value.

FIG. 14 is another exemplary timing waveform diagram illustrating associated signals of the dimming driver circuit adjusted by the control method of FIG. 12, in which the pulses of the real control signal is adjusted and the dimming current is higher than the preset current threshold value. As shown in FIG. 14, the dimming current Idim is higher than the preset current threshold value Imid. For reducing rate of the output current change from the power converting unit 2, the original pulses of the real control signal S2 are redistributed in plural adjusting cycles. In the step 85, the width of one pulse or the widths of some pulses in each adjusting cycle of the real control signal S2 are adjusted according to the first setting. Consequently, the change of the output current from the power converting unit 2 is decreased according to the modified real control signal S2.

As shown in the left side of FIG. 14, the original width of each pulse of the real control signal S2 is equal to Ton1, and the average output current from the power converting unit 2 is equal to Iout1. If the dimming signal S1 is changed and the dimming current Idim is higher than the preset current threshold value Imid, the control unit of the dimming driver circuit will increase or decrease the pulse width by $\Delta$Ton. The current change corresponding to $\Delta$Ton is equal to $\Delta$Iout. In accordance with the control method of the present invention, the original pulses of the real control signal S2 are redistributed in plural adjusting cycles. For example, each adjusting cycle contains 4 pulses. The width of one pulse or the widths of some pulses in each adjusting cycle of the real control signal S2 are increased or decreased by $\Delta$Ton. Consequently, the average pulse change in one adjusting cycle is equal to (4Ton1+$\Delta$Ton)/4, i.e., Ton1+¼$\Delta$Ton. Consequently, the output current from the power converting unit 2 is changed from Iout1 to Iout1+$\Delta$Iout/4 or Iout1−$\Delta$Iout/4. In comparison with FIG. 13, the control method of FIG. 14 can reduce rate of the output current change from the power converting unit 2 in the situation that the dimming current Idim is higher than the preset current threshold value Imid.

Figure 15:
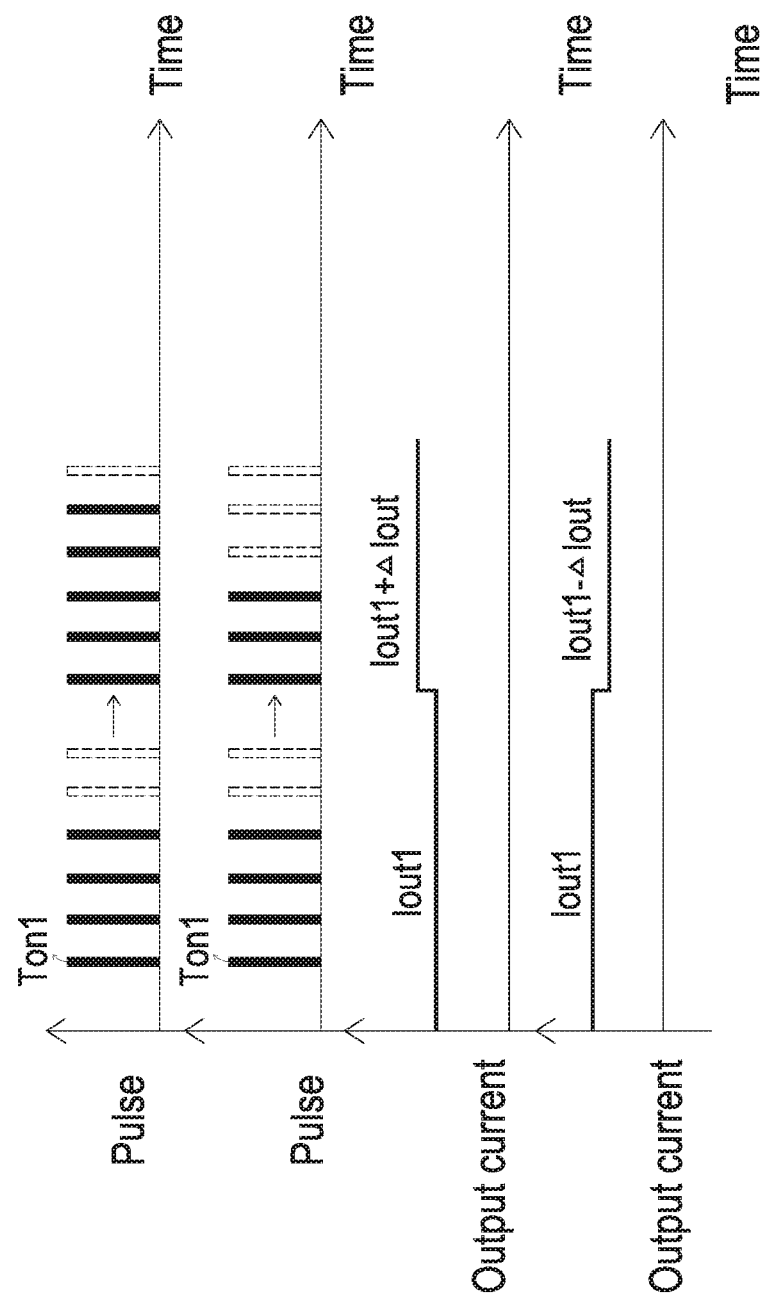
FIG. 15 is an exemplary timing waveform diagram illustrating associated signals of the dimming driver circuit adjusted by the control method of FIG. 12, in which the pulses of the real control signal is adjusted and the dimming current is lower than or equal to the preset current threshold value.

FIG. 15 is an exemplary timing waveform diagram illustrating associated signals of the dimming driver circuit adjusted by the control method of FIG. 12, in which the pulses of the real control signal is adjusted and the dimming current is lower than or equal to the preset current threshold value. As shown in FIG. 15, the dimming current Idim is lower than or equal to the preset current threshold value Imid. As the dimming current Idim is changed, the pulse number of the real control signal S2 in each chopping cycle is changed according to the second setting. In the step 85, the pulse number of the real control signal S2 in each chopping cycle is adjusted according to the second setting.

As shown in FIG. 15, the original pulse number of the real control signal S2 in each chopping cycle is 4, and the average output current from the power converting unit 2 is equal to Iout1. If the dimming signal S1 is changed and the dimming current Idim is lower than or equal to the preset current threshold value Imid, the control unit 5 of the dimming driver circuit 1 of FIG. 1 or the control unit 33 of the dimming driver circuit 30 of FIG. 5 will increase or decrease one pulse according to the second setting. The current change corresponding to the change of one pulse is equal to ΔIout. In accordance with the control method of the present invention, the pulse number of the real control signal S2 in each chopping cycle is increased or decreased by one. Consequently, the output current from the power converting unit 2 is changed from Iout1 to Iout1+ΔIout or Iout1−ΔIout.

Figure 16:
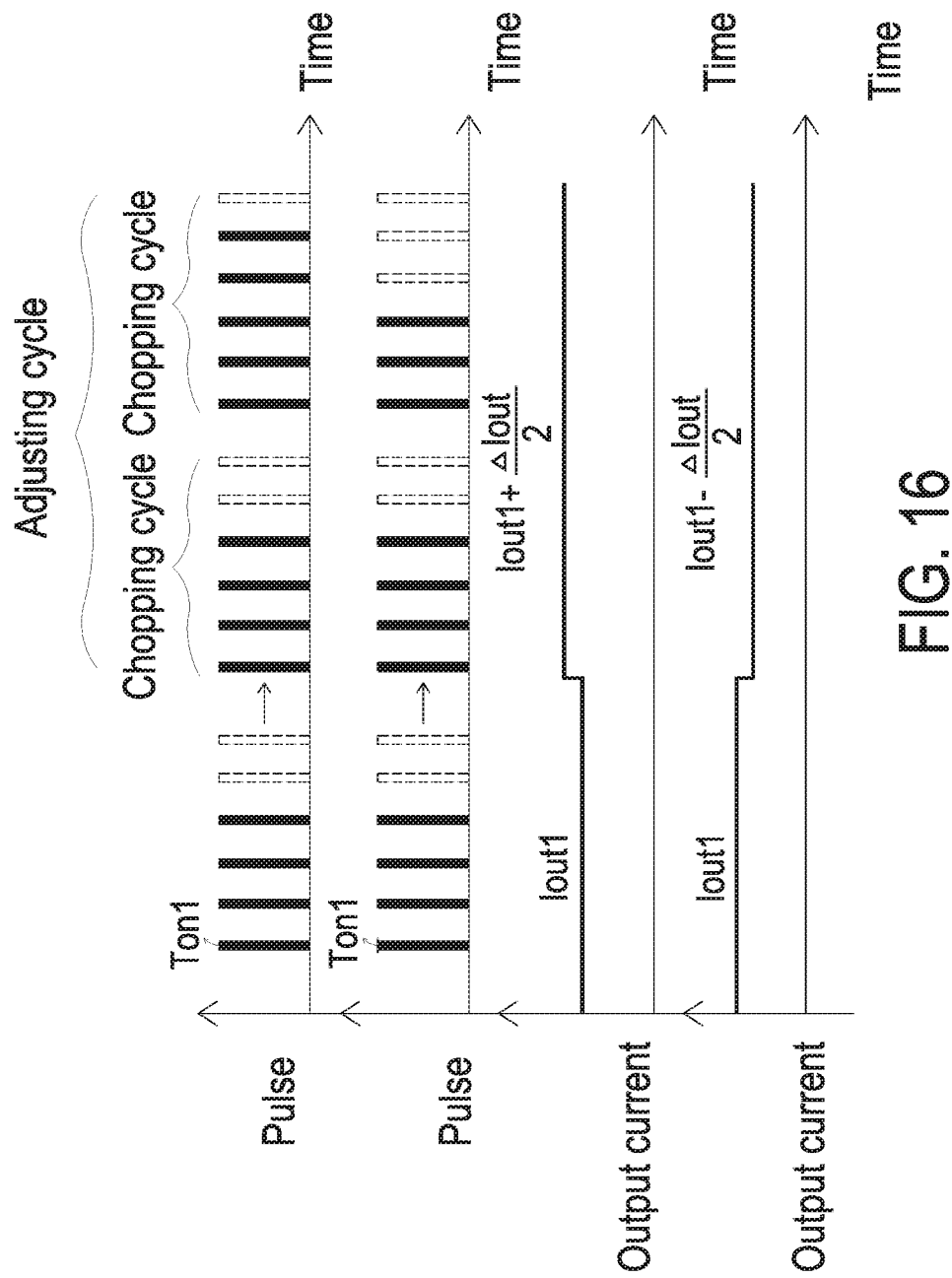
FIG. 16 is another exemplary timing waveform diagram illustrating associated signals of the dimming driver circuit adjusted by the control method of FIG. 12, in which the pulses of the real control signal is adjusted and the dimming current is lower than or equal to the preset current threshold value.

FIG. 16 is another exemplary timing waveform diagram illustrating associated signals of the dimming driver circuit adjusted by the control method of FIG. 12, in which the pulses of the real control signal is adjusted and the dimming current is lower than or equal to the preset current threshold value. As shown in FIG. 16, the dimming current Idim is lower than or equal to the preset current threshold value Imid. For reducing rate of the output current change from the power converting unit 2, the original pulses of the real control signal S2 are redistributed in plural adjusting cycles. The adjusting cycle comprises several chopping cycles, for example, the number of chopping cycles in one adjusting cycle is n. Then, the pulse numbers of the chopping cycles of each adjusting cycle are adjusted according to the second setting. For example, the pulse number of one chopping cycle of the adjusting cycle is increased or decreased by m, or the pulse numbers of some chopping cycles of the adjusting cycle are increased or decreased by m. Consequently, the output current from the power converting unit 2 is changed from Iout1 to (n×Iout1+m×ΔIout)/n or (n×Iout1−m×ΔIout)/n. That is, the output current is changed to Iout1+m×ΔIout/n or Iout1−m×ΔIout/n.

As shown in FIG. 16, the original pulse number of the real control signal S2 in each chopping cycle is 4, each adjusting cycle contains two chopping cycles, and the average output current from the power converting unit 2 is equal to Iout1. If the dimming signal S1 is changed and the dimming current Idim is lower than or equal to the preset current threshold value Imid, the control unit 5 of the dimming driver circuit 1 of FIG. 1 or the control unit 33 of the dimming driver circuit 30 of FIG. 5 will increase or decrease one pulse according to the second setting. The current change corresponding to the change of one pulse is equal to About. In accordance with the control method of the present invention, the pulse number of the real control signal S2 in each chopping cycle of the adjusting cycle is increased or decreased by one. Consequently, the output current from the power converting unit 2 is changed from Iout1 to (Iout1+Iout1+ΔIout)/2 or (Iout1+Iout1−ΔIout)/2. That is, the output current is changed to Iout1+ΔIout/2 or Iout1−ΔIout/2. In comparison with FIG. 15, the control method of FIG. 16 can reduce change of the output current from the power converting unit 2 in the situation that the dimming current Idim is lower than or equal to the preset current threshold value Imid.

From the above descriptions, the present invention provides a dimming driver circuit and a control method. The dimming driver circuit uses the inductor current detecting unit to detect the parameter of the power converting unit. Alternatively, the dimming driver circuit uses the input voltage detection unit and the output voltage detection unit to detect the parameter of the power converting unit. Moreover, the pulse width and pulse number are adjusted in a digital control manner. The dimming driver circuit can increase the precision of the output current from the power converting unit. Since the output current from the power converting unit is precisely adjusted according to the dimming signal, the dimming range becomes wider.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for a dimming driver circuit, the dimming driver circuit being configured for adjusting brightness of a light emitting diode, the dimming driver circuit comprising a power converting unit, the power converting unit comprising a switch element, the switching element being alternately turned on or turned off in plural switching cycles during a switching operation, the control method comprising steps of:

(a) previously defining an initial control signal composed of plural pulses, wherein the plural pulses are generated at a pulse frequency, and the switch element is turned on in the switching cycle corresponding to each pulse;

(b) generating at least one detecting signal according to a result of detecting at least one parameter of the power converting unit;

(c) receiving and processing a dimming signal by a control unit of a dimming driver circuit, thereby generating a corresponding dimming current stored in the control unit;

(d) comparing the dimming current with a preset current threshold value;

(e) defining a first setting or a second setting according to a comparing result of the step (d), wherein when the dimming current is higher than the preset current threshold value, a status information of the switch element in each switching cycle is determined according to the at least one detecting signal and a first setting process, so that the first setting is defined, wherein when the dimming current is lower than or equal to the preset current threshold value, the status information of the switch element in each switching cycle is determined according to the at least one detecting signal and a second setting process, the switching operation of the switch element is divided into plural chopping cycles, and a pulse ratio in at least one chopping cycle is calculated according to the dimming current and the preset current threshold value, so that the second setting is defined; and (f) adjusting the plural pulses of the initial control signal according to the first setting or the second setting, so that a corresponding real control signal is generated, wherein the switching operation of the switch element is controlled according to the real control signal, and an output current corresponding to the dimming signal is generated from the power converting unit to the light emitting diode so as to control the brightness of the light emitting diode.

2. The control method according to claim 1, wherein the power converting unit comprises:
an input side for receiving an input voltage, wherein the input side comprises a positive input terminal and a negative input terminal;
an output side for outputting an output voltage, wherein the output side comprises a positive output terminal and a negative output terminal;
a diode, wherein a cathode of the diode is electrically connected with the positive input terminal and the positive output terminal;
a capacitor, wherein a first end of the capacitor is electrically connected with the positive input terminal, the positive output terminal and the cathode of the diode;
the switch element comprising a first conduction terminal, a second conduction terminal and a control terminal, wherein the first conduction terminal is electrically connected with the negative input terminal, and the control terminal is electrically connected with a low-side driving unit of the dimming driver circuit; and
a first inductor, wherein a first end of the first inductor is electrically connected with an anode of the diode and the second conduction terminal, and a second end of the first inductor is electrically connected with a second end of the capacitor and the negative output terminal.

3. The control method according to claim 2, wherein the step (b) comprises sub-steps of:
generating a first detecting signal according to a result of detecting a voltage value of the input voltage; and
generating a second detecting signal according to a result of detecting a voltage value of the output voltage,
wherein the at least one parameter comprises the input voltage and the output voltage, and the at least one detecting signal comprises the first detecting signal and the second detecting signal.

4. The control method according to claim 3, wherein the status information contains an on time period of the switch element in the switching cycle, wherein in the first setting process, the on time period of the switch element in the switching cycle is calculated according to the first detecting signal, the second detecting signal and the dimming current.

5. The control method according to claim 4, wherein in the second setting process, the on time period of the switch element in the switching cycle is calculated according to the first detecting signal, the second detecting signal and the preset current threshold value.

6. The control method according to claim 4, wherein in the first setting process, the on time period is calculated by the following formula:

$$Ton = \sqrt{Idim \times \frac{2 \times L}{VinAD - VoutAD}} \times \frac{\frac{1}{fs}}{1 + \frac{(VinAD - VoutAD)}{VoutAD}}$$

where, Ton is the on time period, Idim is the dimming current, VinAD is the first detecting signal, and VoutAD is the second detecting signal, fs is the pulse frequency, and L is an inductance of the first inductor.

7. The control method according to claim 2, wherein the step (b) further comprises a sub-step of outputting the at least one detecting signal according to a result of detecting an inductor current of the first inductor, wherein the at least one parameter further contains the inductor current.

8. The control method according to claim 7, wherein the status information denotes an on state and an off state of the switch element in each switching cycle, wherein in the first setting process, the switch element is switched from the off state to the on state when the detecting signal is equal to a first preset value, and the switch element is switched from the on state to the off state when the detecting signal is equal to a second preset value.

9. The control method according to claim 8, wherein the first preset value is zero, and the second preset value is two times of the dimming current.

10. The control method according to claim 7, wherein the status information denotes an on state and an off state of the switch element in each switching cycle, wherein in the second setting process, the switch element is switched from the off state to the on state when the detecting signal is equal to the first preset value, and the switch element is switched from the on state to the off state when the detecting signal is equal to two times of the preset current threshold value.

11. The control method according to claim 1, wherein the status information contains an on time period of the switch element in the switching cycle, wherein when the dimming current is changed and the dimming current is higher than the preset current threshold value, a width of each pulse of the real control signal is adjusted to be equal to the on time period according to the first setting in the step (f).

12. The control method according to claim 1, wherein the status information contains an on time period of the switch element in the switching cycle, wherein when the dimming current is changed and the dimming current is higher than the preset current threshold value, original pulses of the real control signal are redistributed in plural adjusting cycles in the step (f), and a width of at least one of the pulses in the adjusting cycle is adjusted to be equal to the on time period, so that a rate of the output current change from the power converting unit is decreased according to the modified real control signal.

13. The control method according to claim 1, wherein when the dimming current is changed and the dimming current is lower than or equal to the preset current threshold value, a number of the pulses of the real control signal in each chopping cycle is adjusted according to the second setting in the step (f).

14. The control method according to claim 1, wherein when the dimming current is changed and the dimming current is lower than or equal to the preset current threshold value, original pulses of the real control signal are redistributed in plural adjusting cycles in the step (f), and a number of the pulses in one or more chopping cycles of each adjusting cycle is adjusted according to the second setting, so that a rate of the output current change from the power converting unit is decreased according to the modified real control signal.

15. The control method according to claim 1, wherein the pulse ratio in at least one chopping cycle is expressed as K=Idim/Imid, wherein K is the pulse ratio, Idim is the dimming current, and Imid is the preset current threshold value.

16. A dimming driver circuit for adjusting brightness of a light emitting diode, the dimming driver circuit comprising:
a power converting unit comprising an input side, an output side and a switch element, wherein the power converting unit receives an input voltage from the input side, wherein during a switching operation of the switch element, the input voltage is converted into an output voltage, and the output voltage is outputted from the output side;

an input voltage detection unit electrically connected with the input side for detecting a voltage value of the input voltage and generating a first detecting signal according to a detecting result of the input voltage detection unit;

an output voltage detection unit electrically connected with the output side for detecting a voltage value of the output voltage and generating a second detecting signal according to a detecting result of the output voltage detection unit;

a low-side driving unit electrically connected with the switch element for driving the switch element; and a control unit electrically connected with the low-side driving unit, the input voltage detection unit and the output voltage detection unit, wherein the control unit previously defines an initial control signal composed of plural pulses at a pulse frequency, the control unit receives and processes a dimming signal so as to generate a corresponding dimming current stored in the control unit, and the control unit compares the dimming current with a preset current threshold value, wherein when the dimming current is higher than the preset current threshold value, the control unit calculates an on time period of the switch element in a switching cycle according to the first detecting signal, the second detecting signal and the dimming current and defines a first setting according to the on time period, wherein when the dimming current is lower than or equal to the preset current threshold value, the control unit calculates the on time period of the switch element in the switching cycle according to the first detecting signal, the second detecting signal and the preset current threshold value, divides the switching operation of the switch element into plural chopping cycles, calculates a pulse ratio in at least one chopping cycle according to the dimming current and the preset current threshold value, and defines a second setting according to the on time period and the pulse ratio, wherein the control unit adjusts the plural pulses of the initial control signal according to the first setting or the second setting, so that a corresponding real control signal is generated to the low-side driving unit, wherein the switching operation of the switch element is controlled by the low-side driving unit according to the real control signal, and an output current corresponding to the dimming signal is generated from the power converting unit to the light emitting diode so as to control the brightness of the light emitting diode.

17. The dimming driver circuit according to claim 16, wherein the control unit comprises:

a dimming signal processor receiving the dimming signal and generating the dimming current according to the dimming signal;

a storage unit electrically connected with the dimming signal processor for storing the dimming current;

a computing unit electrically connected with the storage unit, the input voltage detection unit and the output voltage detection unit, and comparing the dimming current with the preset current threshold value, wherein when the dimming current is higher than the preset current threshold value, the computing unit calculates the on time period of the switch element in the switching cycle according to the first detecting signal, the second detecting signal and the dimming current and defines the first setting according to the on time period, wherein when the dimming current is lower than or equal to the preset current threshold value, the computing unit calculates the on time period of the switch element in the switching cycle according to the first detecting signal, the second detecting signal and the preset current threshold value, calculates the pulse ratio in the at least one chopping cycle according to the dimming current and the preset current threshold value, and defines the second setting; and a pulse controller electrically connected with the computing unit and previously storing the initial control signal, wherein the pulse controller receives the first setting or the second setting, and adjusts plural pulses of the initial control signal according to the first setting or the second setting, so that the corresponding real control signal is generated to the low-side driving unit.

18. A dimming driver circuit for adjusting brightness of a light emitting diode, the dimming driver circuit comprising:

a power converting unit comprising an input side, an output side, a first inductor and at least one switch element, wherein the first inductor is electrically connected with an end of the switch element, and the power converting unit receives an input voltage from the input side, wherein during a switching operation of the at least one switch element, the input voltage is converted into an output voltage, and the output voltage is outputted from the output side;

an inductor current detecting unit electrically connected with the first inductor, wherein the inductor current detecting unit generates at least one detecting signal according to a result of detecting an inductor current that flows through the first inductor;

a low-side driving unit electrically connected with the switch element for driving the switch element; and a control unit electrically connected with the low-side driving unit and the inductor current detecting unit, wherein the control unit previously defines an initial control signal composed of plural pulses at a pulse frequency, the control unit receives and processes a dimming signal so as to generate a corresponding dimming current stored in the control unit, and the control unit compares the dimming current with a preset current threshold value, wherein when the dimming current is higher than the preset current threshold value, the control unit controls the switch element to be switched from the off state to the on state when the detecting signal is equal to a first preset value, controls the switch element to be switched from the on state to the off state when the detecting signal is equal to a second preset value, and defines a first setting, wherein when the dimming current is lower than or equal to the preset current threshold value, the control unit controls the switch element to be switched from the off state to the on state when the detecting signal is equal to the first preset value, controls the switch element to be switched from the on state to the off state when the detecting signal is equal to two times of the preset current threshold value, divides the switching operation of the switch element into plural chopping cycles, calculates a pulse ratio in at least one chopping cycle according to the dimming current and the preset current threshold value, and defines a second setting according to the first preset value, two times of the preset current threshold value and the pulse ratio, wherein the control unit adjusts the plural pulses of the initial control signal according to the first setting or the second setting, so that a corresponding real control signal is generated to the low-side driving unit, wherein the switching operation of the switch element is controlled by the low-side driving unit according to the real control signal, and an output current corresponding to the dimming signal is generated from the power converting unit to the light emitting diode so as to control the brightness of the light emitting diode.

19. The dimming driver circuit according to claim 18, wherein the control unit comprises:
- a dimming signal processor receiving the dimming signal and generating the dimming current according to the dimming signal;
- a storage unit electrically connected with the dimming signal processor for storing the dimming current;
- a computing unit electrically connected with the storage unit and inductor current detecting unit, previously storing the preset current threshold value, and comparing the dimming current with the preset current threshold value, wherein when the dimming current is higher than the preset current threshold value, the computing unit controls the switch element to be switched from the off state to the on state when the detecting signal is equal to the first preset value, controls the switch element to be switched from the on state to the off state when the detecting signal is equal to the second preset value, and defines the first setting, when the dimming current is lower than or equal to the preset current threshold value, the computing unit controls the switch element to be switched from the off state to the on state when the detecting signal is equal to the first preset value, controls the switch element to be switched from the on state to the off state when the detecting signal is equal to two times of the preset current threshold value, divides a switching operation of the switch element into plural chopping cycles, calculates a pulse ratio in at least one chopping cycle according to the dimming current and the preset current threshold value, and defines the second setting according to the first preset value, two times of the preset current threshold value and the pulse ratio; and
- a pulse controller electrically connected with the computing unit and previously storing the initial control signal, wherein the pulse controller receives the first setting or the second setting, and adjusts plural pulses of the initial control signal according to the first setting or the second setting, so that the corresponding real control signal is generated to the low-side driving unit.

* * * * *